United States Patent
Ward et al.

(10) Patent No.: US 12,494,003 B2
(45) Date of Patent: Dec. 9, 2025

(54) AUTOMATIC LAYER FLATTENING WITH REAL-TIME VISUAL DEPICTION

(71) Applicant: Cricut, Inc., South Jordan, UT (US)

(72) Inventors: Jason Ward, Oakland, CA (US); Gitta Salomon, San Francisco, CA (US); Lara Beth Mitchell, San Francisco, CA (US); Micah Wilson, South Jordan, UT (US); Braden Scothern, West Jordan, UT (US); Matt Stoker, Bountiful, UT (US)

(73) Assignee: Cricut, Inc., South Jordan, UT (US)

( * ) Notice: Subject to any disclaimer, the term of this patent is extended or adjusted under 35 U.S.C. 154(b) by 159 days.

(21) Appl. No.: 18/001,120

(22) PCT Filed: Jun. 9, 2021

(86) PCT No.: PCT/US2021/036575
§ 371 (c)(1),
(2) Date: Dec. 8, 2022

(87) PCT Pub. No.: WO2021/252602
PCT Pub. Date: Dec. 16, 2021

(65) Prior Publication Data
US 2023/0215064 A1     Jul. 6, 2023

Related U.S. Application Data

(60) Provisional application No. 63/036,884, filed on Jun. 9, 2020.

(51) Int. Cl.
G06T 11/60     (2006.01)
G06F 3/04817   (2022.01)
(Continued)

(52) U.S. Cl.
CPC .......... G06T 11/60 (2013.01); G06F 3/04817 (2013.01); G06F 3/0482 (2013.01);
(Continued)

(58) Field of Classification Search
CPC .... G06F 3/0484; G06F 3/0481; G06F 3/0482; G06F 3/04845; G06F 3/04817; H04M 1/72469; G06T 11/60; G06T 2200/24
See application file for complete search history.

(56) References Cited

U.S. PATENT DOCUMENTS 6,859,553 B1   2/2005   Bourdev et al.
9,904,692 B2   2/2018   Campbell et al.
(Continued)

FOREIGN PATENT DOCUMENTS

JP   2008147850 A   6/2008
JP   2017064857 A   4/2017

OTHER PUBLICATIONS

"CorelDRAW User Guide 2018", Jan. 1, 2018 (Jan. 1, 2018), pp. 1-337, XP093162988, Retrieved from the Internet: URL:https://media.kieskeurig.nl/images/01/90/58/6f/f2ca/467a/99af/7d8fa7d88adf/orig. pdf the whole document.

(Continued)

Primary Examiner — Weiming He
(74) Attorney, Agent, or Firm — Honigman LLP; Grant Griffith

(57) ABSTRACT

A method includes executing a design generating program configured to display on a screen a graphical user interface having a virtual canvas window configured to present selected content objects to be incorporated into a unique design, and a content object selection window including available content objects to select from for presentation in the virtual canvas window. The program is configured to: receive, in the content object selection window, selection
(Continued)

inputs indicating selection of first and second content objects and display the first and second content objects in the virtual canvas window. The program is further configured to receive, in the virtual canvas window, manipulation inputs to move the first content object to a target position relative to the second content object, and based on the first and second content objects overlapping, generate, for display in the virtual canvas window, the unique design.

22 Claims, 15 Drawing Sheets

(51) Int. Cl.
    *G06F 3/0482*     (2013.01)
    *G06F 3/04842*     (2022.01)
    *G06F 3/04845*     (2022.01)

(52) U.S. Cl.
    CPC ...... *G06F 3/04842* (2013.01); *G06F 3/04845* (2013.01); *G06T 2200/24* (2013.01)

(56) References Cited

U.S. PATENT DOCUMENTS

| | | |
|---|---|---|
| 2012/0206471 A1 | 8/2012 | Sarnoff et al. |
| 2013/0346924 A1 | 12/2013 | Morrill et al. |
| 2017/0364248 A1 | 12/2017 | Tran et al. |
| 2018/0047033 A1 | 2/2018 | Johnson |
| 2020/0134893 A1* | 4/2020 | Swider ................ G06F 3/04845 |

OTHER PUBLICATIONS

"Adobe Photoshop elements help", May 11, 2019 (May 11, 2019), pp. 1-394,XP093163025,Retrieved from the Internet: URL:https://helpx.adobe.com/pdf/photoshop-elements reference.pdf the whole document.

EPO. European Search Report relating to application No. 21822745.2-1218, dated Jun. 6, 2024.

International Search Report and Written Opinion relating to Application No. PCT/US2021/036575.

* cited by examiner

AUTOMATIC LAYER FLATTENING WITH REAL-TIME VISUAL DEPICTION

CROSS REFERENCE TO RELATED APPLICATIONS

This U.S. patent application claims priority to PCT Application No. PCT/US2021/036575, designating the United States of America, filed on Jun. 9, 2021, which claims priority which claims priority under 35 U.S.C. § 119 (e) from, U.S. Provisional Application No. 63/036,884, filed on Jun. 9, 2020. The disclosures of the prior applications are considered part of the disclosure of this application and are hereby incorporated by reference in their entireties.

TECHNICAL FIELD

This disclosure relates to automatic layer flattening with real-time visual depiction.

BACKGROUND

When designing graphics for cutting with cutting machines or forming with other manufacturing machines, such as laser cutter or three-dimensional printers, crafters, designers, and artists often use multiple graphics or shapes to create a new design or portion of a design to be incorporated on a material by the manufacturing machine. When designing new designs, it is difficult to visualize a final design to be incorporated onto a material and/or difficult to revert back to previous stages of the design.

SUMMARY

One aspect of the disclosure provides computer-implemented method when executed on data processing hardware causes the data processing hardware to perform operations including executing a design generating program configured to display on a screen in communication with the data processing hardware a graphical user interface having: a virtual canvas window configured to present one or more selected content objects to be incorporated into a unique design; and a content object selection window including available content objects to select from for presentation in the virtual canvas window. The design generating program is configured to: receive, in the content object selection window, selection inputs from a user indicating selection of first and second content objects from the available content objects; after receiving the selection inputs, display the first and second content objects in the virtual canvas window; receive, in the virtual canvas window, manipulation inputs from the user to move the first content object to a target position in the virtual canvas window relative to the second content object displayed in the virtual canvas window; and based on the first content object and the second content object overlapping when the first content object is moved to the target position, generate, for display in the virtual canvas window, the unique design by combining respective portions of the first content object and the second content object.

Implementations of the disclosure may include one or more of the following optional features. In some implementations, the available content objects include at least one of shapes, text characters/symbols, and/or photos. The graphical user interface displayed on the screen may further have a content type selection window including one or more content icons each associated with a respective content object type, wherein the design generating program is further configured to: receive, in the content type selection window, a content object type input from the user indicating selection of one of the content icons; and in response to receiving the content object type input, display, in the graphical user interface, the content object selection window including the available content objects to select from for presentation in the virtual canvas window. Here, each available content object includes the respective content object type associated with the selected one of the content icons.

In some examples, the design generating program displays the first and second content objects in the virtual canvas window by: superimposing, in the graphical user interface, the first content object on a first visual layer for display in the virtual canvas window; and superimposing, in the graphical user interface, the second content object on a second visual layer for display in the virtual canvas layer. In these examples, the second content object superimposed on the second visual layer and the first content object superimposed on the first visual layer are capable of being manipulated independent from one another while displayed in the virtual canvas window. Additionally, the design generating program may be further configured to, when generating the unique design by combining the respective portions of the first content object and the second content object, superimpose the unique design on a flattened output layer for display in the virtual canvas window. Here, the flattened output layer is generated by combining the first visual layer and the second visual layer. Moreover, the design generating program may be further configured to: represent the first visual layer as a first outline graphic surrounding the first content object superimposed on the first visual layer; and represent the second visual layer as a second outline graphic surrounding the second content object superimposed on the first visual layer, wherein the second outline graphic is visually distinct from the first outline graphic.

In some implementations, the design generating program is further configured to, for each corresponding content object among the first and second content objects displayed in the virtual canvas window: assign a respective set of available actions to perform on a material using the corresponding content object to create the unique design on the material; selectively display, in the graphical user interface, a respective available action menu superimposed on the virtual canvas window adjacent to the corresponding content object, the respective available action menu presenting one or more action icons each associated with a respective action from the respective set of available actions; select, from the respective set of available actions assigned to the corresponding content object, one of the actions to be performed on the material using the corresponding content object; and in response to selecting the one of the actions to be performed, augment, in the graphical user interface, a corresponding action icon among the one or more action icons presented in the respective available action menu that is associated with the selected action to be performed on the material.

The design generating program may be configured to display the respective available action menu in the graphical user interface in response to receiving a manipulation input from the user indicating selection of the corresponding content object to manipulate the corresponding content object while displayed in the virtual canvas window. Additionally or alternatively, the design generating program may be further configured to obtain context information associated with the first and second content objects displayed in the virtual canvas window, wherein the available actions in the respective set of available actions assigned to each corresponding content object among the first and second content objects dynamically update based on the obtained context information.

The obtained context information may include at least one of: the relative positions of the first and second content objects displayed in the virtual canvas window; a dimension/size/orientation of each of the first and second content objects displayed in the virtual canvas window; a respective content object type associated with each of the first and second content objects; any actions to perform on the material that are currently selected for the first content object and/or the second content object; properties of the material; and/or a type of machine to be employed for creating the unique design on the material. In some examples, the design generating program is further configured to select the one of the actions from the respective set of available actions in response to receiving, in the graphical user interface, an action selection input from the user indicating selection of the action icon presented in the displayed respective available action menu that is associated with the respective action.

In some implementations, the design generating program is further configured to receive, in the virtual canvas window, one or more additional manipulation inputs from the user to at least one of re-size and/or re-orientate the first content object and/or the second content object displayed in the virtual canvas window. Additionally or alternatively, the design generating program may be further configured to: select, from a first set of available actions assigned to the first content object, a first action to perform on a material using the first content object; and select, from a second set of available actions assigned to the second content object, a second action to perform on the material using the second content object, the second action different than the first action, wherein generating the unique design is further based on the first action and the second action to perform on the material. The operations may further include instructing a machine in communication with the data processing hardware to create the unique design on a material. The machine may be capable of performing one or more of the following actions on the material: electronic cutting; laser cutting; cutting; milling; embossing; stitching; heat-pressing; printing; drawing; and/or three-dimensional printing.

Another aspect of the disclosure provides a system including data processing hardware and memory hardware in communication with the data processing hardware and storing instructions that when executed on the data processing hardware causes the data processing hardware to perform operations including executing a design generating program configured to display on a screen in communication with the data processing hardware a graphical user interface having: a virtual canvas window configured to present one or more selected content objects to be incorporated into a unique design; and a content object selection window including available content objects to select from for presentation in the virtual canvas window. The design generating program is configured to: receive, in the content object selection window, selection inputs from a user indicating selection of first and second content objects from the available content objects; after receiving the selection inputs, display the first and second content objects in the virtual canvas window; receive, in the virtual canvas window, manipulation inputs from the user to move the first content object to a target position in the virtual canvas window relative to the second content object displayed in the virtual canvas window; and based on the first content object and the second content object overlapping when the first content object is moved to the target position, generate, for display in the virtual canvas window, the unique design by combining respective portions of the first content object and the second content object.

This aspect may include one or more of the following optional features. In some implementations, the available content objects include at least one of shapes, text characters/symbols, and/or photos. The graphical user interface displayed on the screen may further have a content type selection window including one or more content icons each associated with a respective content object type, wherein the design generating program is further configured to: receive, in the content type selection window, a content object type input from the user indicating selection of one of the content icons; and in response to receiving the content object type input, display, in the graphical user interface, the content object selection window including the available content objects to select from for presentation in the virtual canvas window. Here, each available content object includes the respective content object type associated with the selected one of the content icons.

In some examples, the design generating program displays the first and second content objects in the virtual canvas window by: superimposing, in the graphical user interface, the first content object on a first visual layer for display in the virtual canvas window; and superimposing, in the graphical user interface, the second content object on a second visual layer for display in the virtual canvas layer. In these examples, the second content object superimposed on the second visual layer and the first content object superimposed on the first visual layer are capable of being manipulated independent from one another while displayed in the virtual canvas window. Additionally, the design generating program may be further configured to, when generating the unique design by combining the respective portions of the first content object and the second content object, superimpose the unique design on a flattened output layer for display in the virtual canvas window. Here, the flattened output layer is generated by combining the first visual layer and the second visual layer. Moreover, the design generating program may be further configured to: represent the first visual layer as a first outline graphic surrounding the first content object superimposed on the first visual layer; and represent the second visual layer as a second outline graphic surrounding the second content object superimposed on the first visual layer, wherein the second outline graphic is visually distinct from the first outline graphic.

In some implementations, the design generating program is further configured to, for each corresponding content object among the first and second content objects displayed in the virtual canvas window: assign a respective set of available actions to perform on a material using the corresponding content object to create the unique design on the material; selectively display, in the graphical user interface, a respective available action menu superimposed on the virtual canvas window adjacent to the corresponding content object, the respective available action menu presenting one or more action icons each associated with a respective action from the respective set of available actions; select, from the respective set of available actions assigned to the corresponding content object, one of the actions to be performed on the material using the corresponding content object; and in response to selecting the one of the actions to be performed, augment, in the graphical user interface, a corresponding action icon among the one or more action icons presented in the displayed respective available action menu that is associated with the selected action to be performed on the material.

The design generating program may be configured to display the respective available action menu in the graphical user interface in response to receiving a manipulation input from the user indicating selection of the corresponding content object to manipulate the corresponding content object while displayed in the virtual canvas window. Additionally or alternatively, the design generating program may be further configured to obtain context information associated with the first and second content objects displayed in the virtual canvas window, wherein the available actions in the respective set of available actions assigned to each corresponding content object among the first and second content objects dynamically update based on the context information.

The obtained context information may include at least one of: relative positions of the first and second content objects displayed in the virtual canvas window; a dimension/size/orientation of each of the first and second content objects displayed in the virtual canvas window; a respective content object type associated with each of the first and second content objects; any actions to perform on the material that are currently selected for the first content object and/or the second content object; properties of the material; and/or a type of machine to be employed for creating the unique design on the material. In some examples, the design generating program is further configured to select the one of the actions from the respective set of available actions in response to receiving, in the graphical user interface, an action selection input from the user indicating selection of the action icon presented in the displayed respective available action menu that is associated with the respective action.

In some implementations, the design generating program is further configured to receive, in the virtual canvas window, one or more additional manipulation inputs from the user to at least one of re-size and/or re-orientate the first content object and/or the second content object displayed in the virtual canvas window. Additionally or alternatively, the design generating program may be further configured to: select, from a first set of available actions assigned to the first content object, a first action to perform on a material using the first content object; and select, from a second set of available actions assigned to the second content object, a second action to perform on the material using the second content object, the second action different than the first action, wherein generating the unique design is further based on the first action and the second action to be performed on the material. The operations may further include instructing a machine in communication with the data processing hardware to create the unique design on a material. The machine may be capable of performing one or more of the following actions on the material: electronic cutting; laser cutting; cutting; milling; embossing; stitching; heat-pressing; printing; drawing; or three-dimensional printing.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
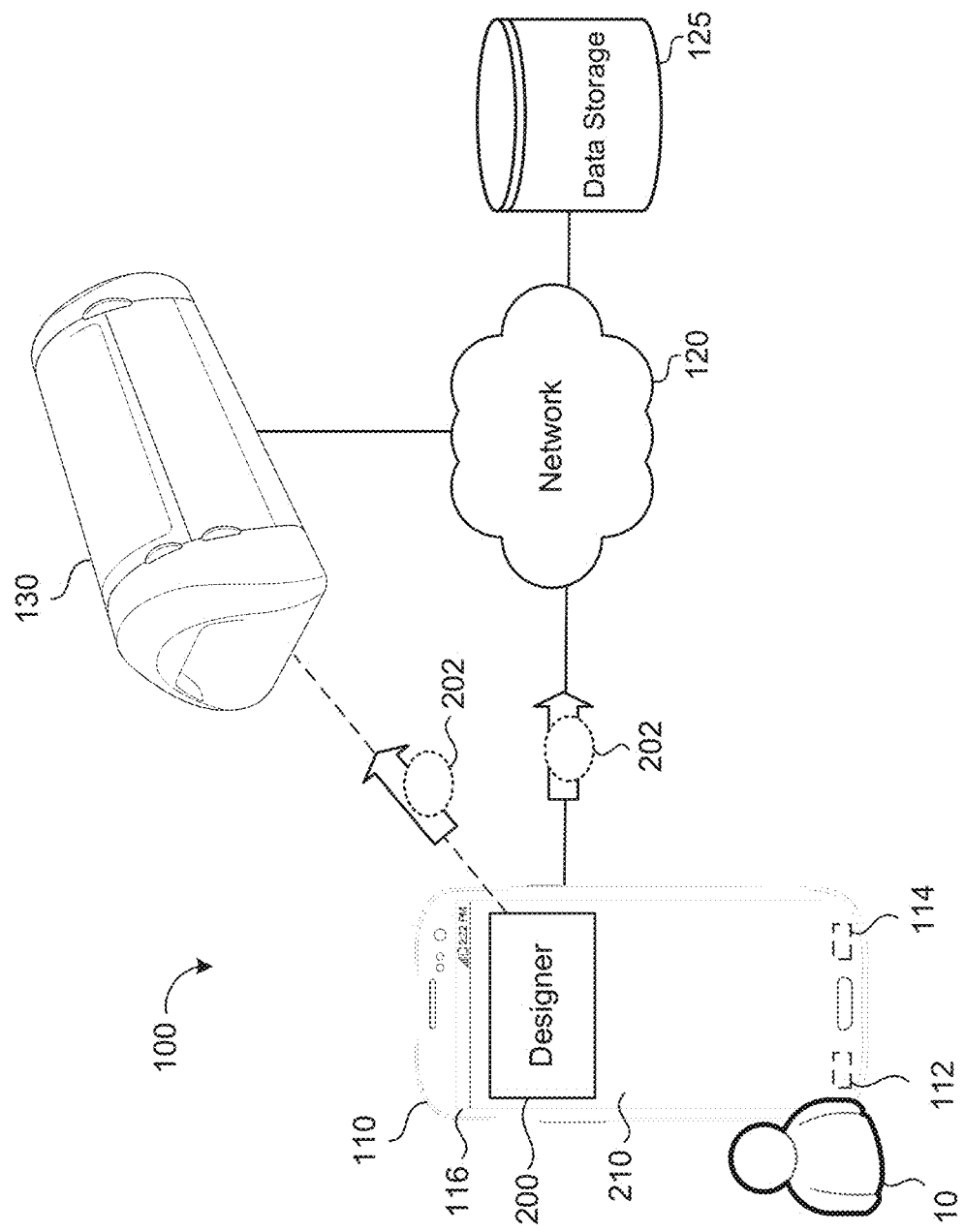
FIG. 1 is a schematic view of a graphic preparation environment, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

As used herein, the terms "including," "comprising," "having," and variations thereof mean "including but not limited to" unless expressly specified otherwise. Accordingly, the terms "including," "comprising," "having," and variations thereof are intended to cover a non-exclusive inclusion, such that a process, method, article, or apparatus that comprises a list of elements does not include only those elements but may include other elements not expressly listed or inherent to such process, method, article, or apparatus. An enumerated listing of items does not imply that any or all of the items are mutually exclusive and/or mutually inclusive, unless expressly specified otherwise.

Further, in the detailed description herein, references to "one embodiment," "an embodiment," "various embodiments," "one example," "an example," "some examples," "one implementation," "an implementation," "some implementations," etc., indicate that the embodiment, implementation, or example described may include a particular feature, structure, or characteristic, but every embodiment may not necessarily include the particular feature, structure, or characteristic. Moreover, such phrases are not necessarily referring to the same embodiment. Thus, when a particular feature, structure, or characteristic is described in connection with an embodiment or an implementation, it is submitted that it is within the knowledge of one skilled in the art to affect such feature, structure, or characteristic in connection with other embodiments whether or not explicitly described. Similarly, the use of the term "implementation" means an implementation having a particular feature, structure, or characteristic described in connection with one or more embodiments of the present disclosure. Absent an express correlation to indicate otherwise, an implementation may be associated with one or more embodiments. After reading the description, it will be apparent to one skilled in the relevant art(s) how to implement the disclosure in alternative embodiments.

Implementations herein are directed toward methods and systems for flattening and fusing visual layers associated with a unique design for use by a machine to implement the unique design on a material. For example, in at least one aspect of the present disclosure, multiple layers each representing a respective object/graphic can be flattened automatically when overlapping to create a single layer representative of a unique design for presentation on a graphical user interface for a user to view before implementing the design on the material. In this way, the user does not need to provide manual inputs to flatten multiple layers as each layer is added or overlapped with another layer In some implementations, flattening layers includes presenting a real-time visual depiction of a flattened graphic for display on a graphical user interface so a user can visualize the unique design. The ability to visualize a design/graphic is especially advantageous when designing a graphic for cutting on a cutting machine or otherwise forming the graphic on a material with other types of manufacturing machines, such as laser cutters, three-dimensional printers, embossers, milling machine, etc. For instance, it is often vital for the designer to visualize the overall design as it would appear when cut so that the designer can determine whether changes to the design need to be made before cutting, thus saving time and material.

As will become apparent, the methods and techniques disclosed herein for flattening graphical layers provides intuitive, easy-to-use graphical interface functionalities that enable designers to quickly and independently manipulate graphics from different layers while visualizing the flattened end-product in real-time. In this way, designers can, in effect, manipulate a flattened-looking design with independent portions (i.e., independent layers) in real time.

In addition, at least one aspect of the present disclosure includes a method of flattening multiple layers of an image with intuitive user-interface functionalities that change independent portions of the design, which originate or may have originated from different layers, from positive spaces representing the presence of material after being cut on a cutting machine to negative spaces representing the absence of material after being cut. Here, the ability to visualize and manipulate graphics in real time is done before instructions for cutting are provided to the cutting machine, thereby reducing the need to re-design and re-cut after cutting the material if the cut graphic did not turn out as planned.

FIG. 1 provides an example design preparation environment 100 (also referred to as "environment 100") that includes a user 10 using a user device 110 to create a unique design 202 (i.e., a graphical design) during a design process. The user device 110 may include data processing hardware 112 and memory hardware 114 in communication with the data processing hardware 112. The memory hardware 114 may store instructions thereon that, when executed on/by the data processing hardware 112, causes the data processing hardware 112 to execute a design generating program 200 (also referred to as "designer 200") for creating the unique design 202 during the design process. Once the design 202 from the design process is complete or the user 10 wants to implement the design 202, the user device 110 may provide the design 202 for post-design processing operations that may include a printing and/or a converting process (e.g., forming, cutting, printing, etc.) to implement the design on a material. That is, the post-design processing operation(s) may convert the design 202 into a physical product or other tangible medium.

For instance, in the example shown, the designer 200 communicates the design 202 to a post-design processing machine 130 configured to implement the received design 202 on a material. The designer 200 may communicate the design 202 to the machine 130 via an indirect connection (e.g., a network 120) or a direct connection (e.g., using a wired connection as shown by the dotted line of FIG. 1). In the example shown, the post-design processing machine 130 includes a cutting machine configured to cut the unique design 202 from a cutting material. The post-design processing machine 130 may be capable of performing, without limitation, one or more of the following actions on a material: electronic cutting; laser cutting; cutting; milling; embossing; stitching; heat-pressing; printing; drawing; or three-dimensional printing.

The user device 110 may correspond to any computing device associated with the user 10 and capable of executing the design generating program (i.e., the designer) 200 to generate the unique design 202. Some examples of user devices 110 include, but are not limited to, mobile phones, tablets, laptops, desktop computers, etc. In some examples, the design generating program 200 executes on the post-design processing machine 130. Here, the designer 200 may refer to a software application hosted on the user device 110 or some portion of a software application hosted on the user device 110. For instance, the designer 200 may include a module within larger graphics editor software. Additionally or alternatively, the designer 200 may be a proprietary application or a portion of a proprietary application. For instance, the designer 200 may include proprietary application specific to the post-design processing machine 130. In some implementations, the designer 200 runs on the post-design processing machine 130.

The designer 200 may be generally configured to perform design functions, such as layout, editing, formatting, importing/exporting features (e.g., images, shapes, text, etc.), etc. In some implementations, the designer 200 is configured to display on a screen/display 116 in communication with the data processing hardware 112 a graphical user interface 210 that enables the user 10 to interact with the designer 200 to perform design functions. Here, the user 10 may interact with the graphical user interface 210 on the display 116 of the device 110 as the data processing hardware 112 of the device 110 executes the designer 200.

Figure 3:
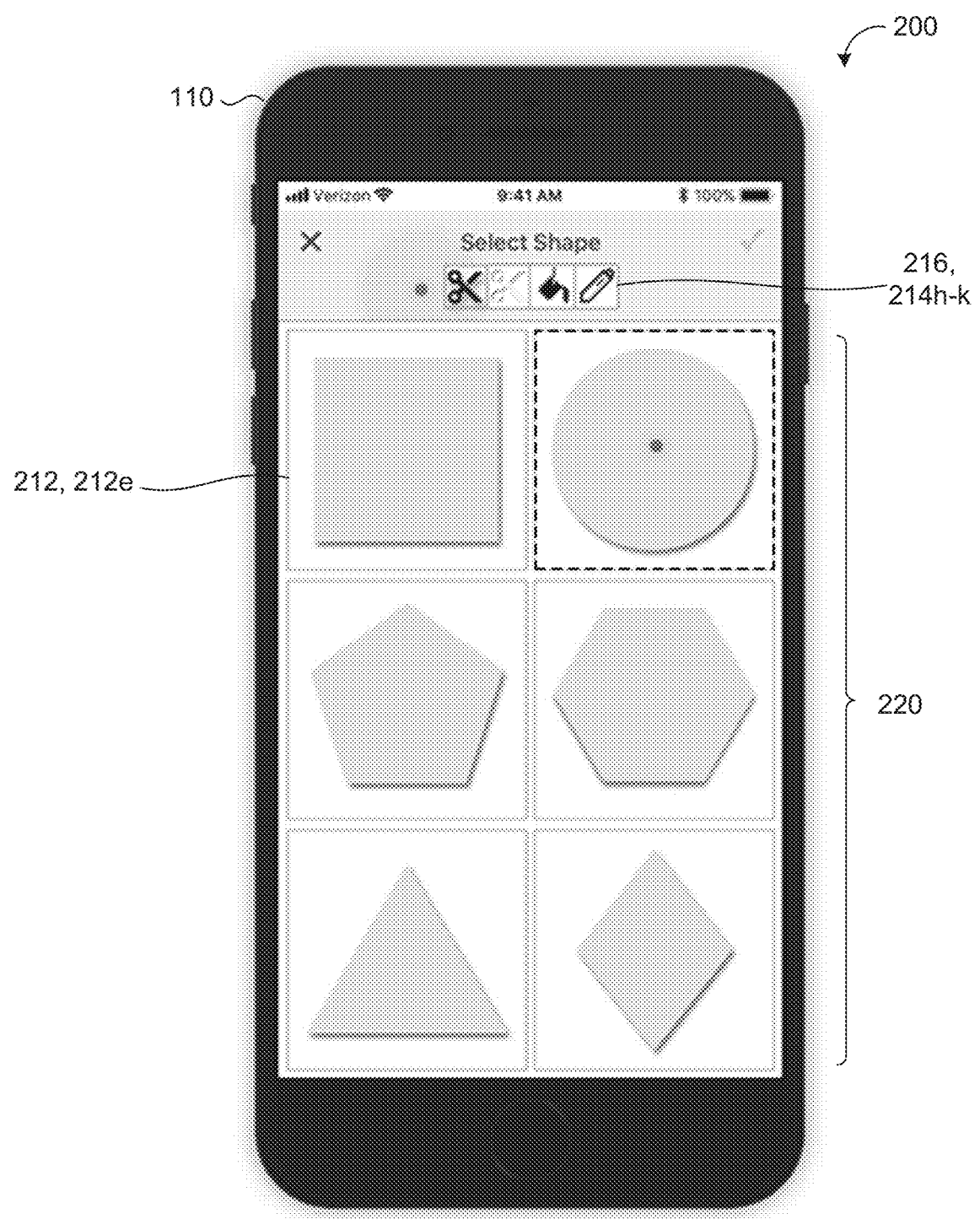
FIGS. 3 and 4 are schematic views of example graphical user interfaces having content object selection windows for selecting available content objects for presentation in the virtual canvas window of FIG. 2, in accordance with various embodiments.
Figure 4:
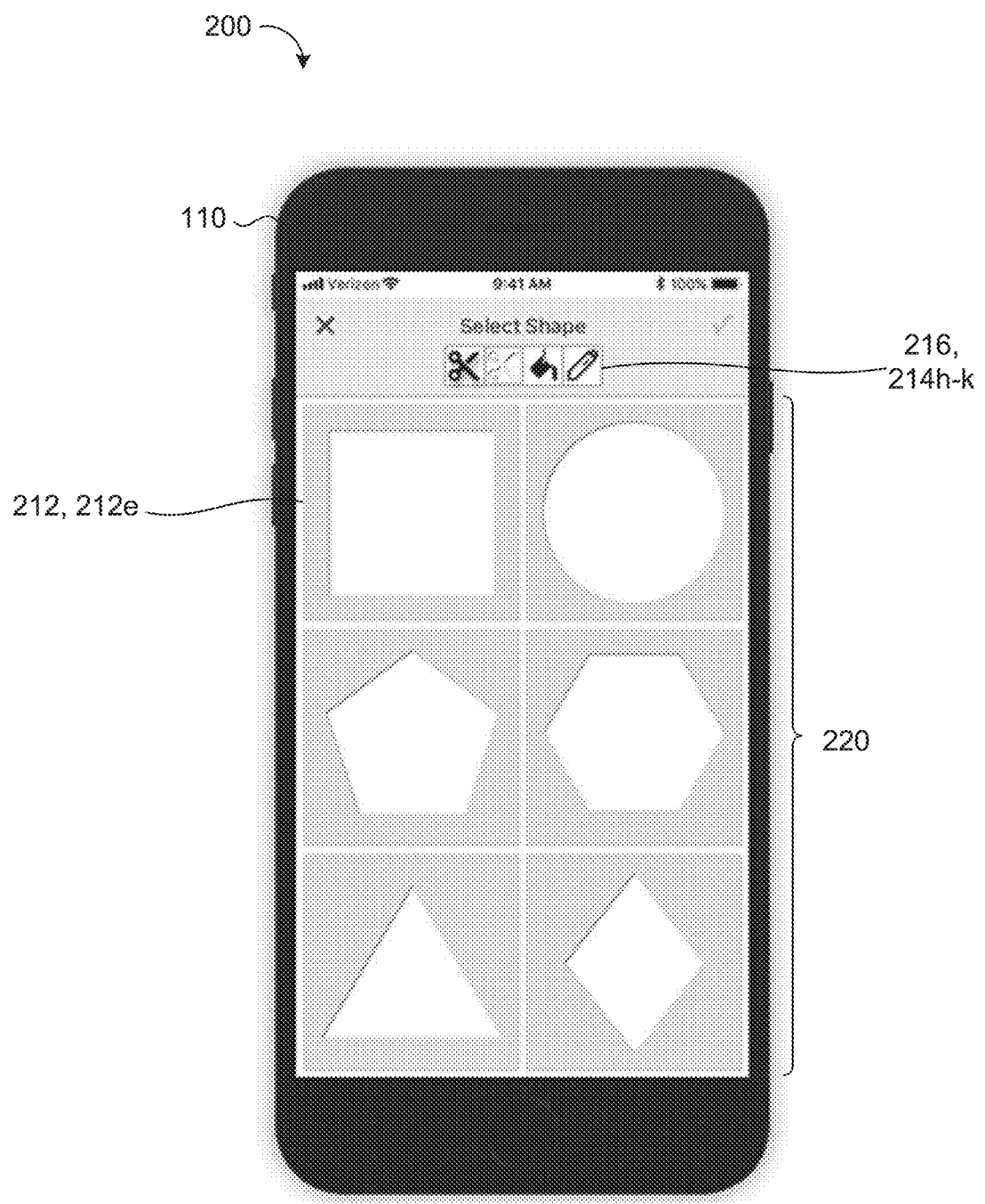

In some examples, the graphical user interface 210 has windows 212, 212a-e including a virtual canvas window 212a and a content object selection window 212e (FIGS. 3 and 4). The virtual canvas window 212a may be configured to present one or more selected content objects 220 to be incorporated into the unique design 202. As will become apparent, the virtual canvas window 212 virtually represents a sheet of material to provide a virtual canvas to layout and/or build the unique design 202 to be formed from the sheet of material, according to various embodiments. The content object selection window 212e may include available content objects 220 for selective presentation in the virtual canvas window 220a. One or more of the windows 212 may contain selectable icons 214, 214a-k that the user 10 may select to facilitate the creation or the modification of a design 202. Each icon 214 may correspond to a particular function depending on the window 212 where the particular icon 214 is located in the graphical user interface 210. In some examples, the user 10 interacts with the graphical user interface to combine multiple content objects 220 into a single unique design 202 for cutting on a cutting machine 130. For example, the designer 200 may allow the user 10 to have a real-time view of automatic layer flattening for presenting the design 202 on the graphical user interface 210 as the designer 200 creates the design 202 from a multitude of different content objects 220. As used herein, the terms content object 220 and graphic 220 may be used interchangeably. For simplicity, the implementations herein will refer to the post-design operating machine as a cutting machine, however, the post-design operating machine 130 may performing any of the aforementioned actions in lieu of, or in addition, to cutting.

Although FIGS. 2-13 depict some example graphic user interfaces 210 facilitating user interaction with the designer 200 for generating a unique design 202 (e.g., particular layouts) based on different shapes/graphics, the examples are merely illustrative representations of the functionality of the designer 200. The configurations of options and functionalities provided by a user interface 210, including the placement and visual representations of functional buttons/icons 214 and other artistic or functional layout configurations, may vary from what is shown in the figures without departing from the spirit of the invention as described in the claims. The same applies for the example content objects 220 and graphical designs 202 depicted, whereby rudimentary shapes are provided by example only to illustrate an example design process. As such, the designer 200 can be expanded beyond the examples disclosed herein to enable the designing of an unlimited number of designs 202 including any combination of any shape, color, photo, character/text, custom designs, or any type of graphic generally enabled by conventional design software.

Figure 2:
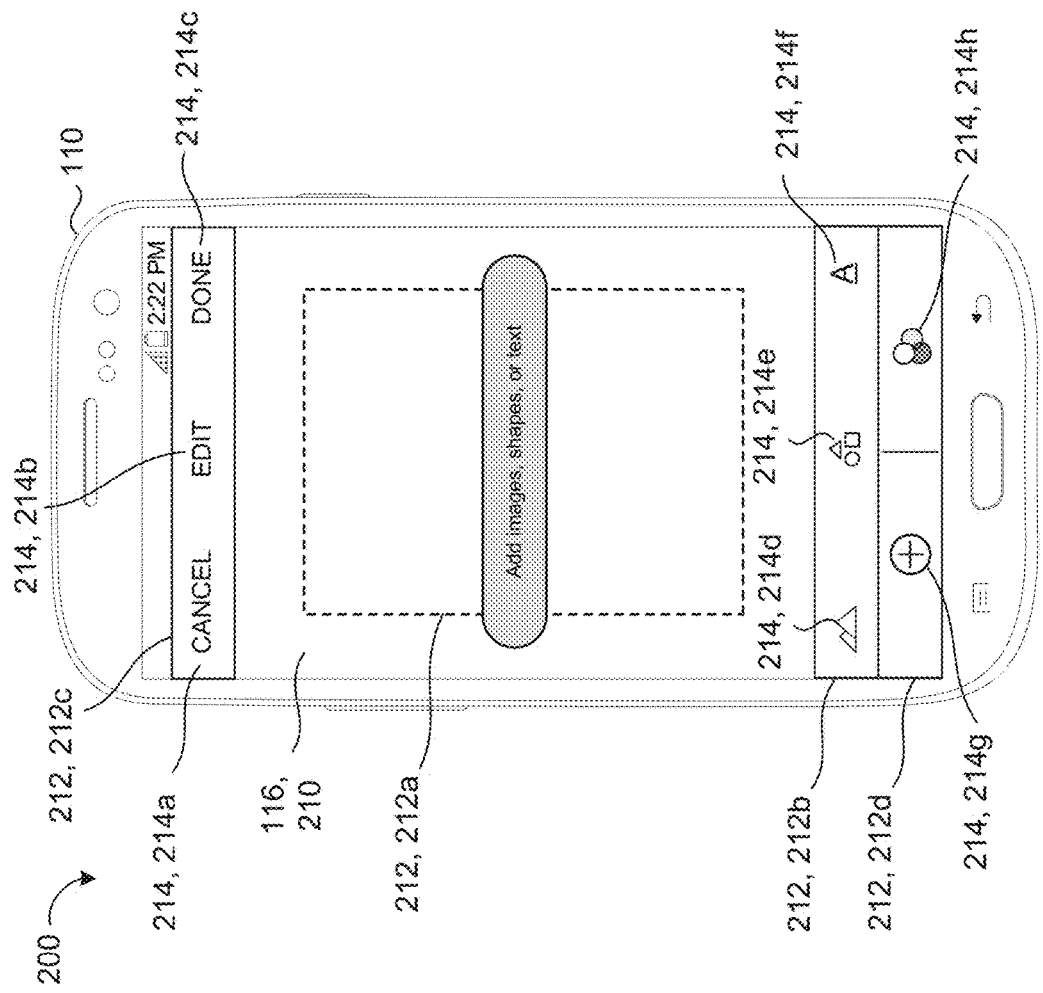
FIG. 2 is a schematic view of an example graphical user interface having a virtual canvas window for presenting one or more content objects, in accordance with various embodiments.

Referring to FIG. 2, the graphical user interface 210 may also have a content type selection window 212b including one or more icons 214d-f each associated with a respective content object type. For instance, photo icon 214d is associated with a content object type corresponding to photos, shape icon 214e is associated with a content object type corresponding to shapes, and text icon 214f is associated with a content object type corresponding to textual characters (e.g., letters, numbers, and/or symbols). In the example shown, the designer 200 receives, in the content type selection window 212b, a content object type input from the user 10 indicating selection of the shape icon 214e, and in response, displays, in the graphical user interface 210, the content object selection window 212e (FIGS. 3 and 4) includes available content objects 220 to select from for presentation in the virtual canvas window 212a. As shown in FIGS. 3 and 4, each available content object 220 in the content object selection window 212e includes the respective content object type (e.g., shapes) associated with the selected one of the content icons 214d-f (e.g., shape icon 214e). Here, the shapes correspond to shapes that may be selected by the user 10 to present in the virtual canvas window 212a for creating the graphical design 202. Notably, if the received content object type input instead indicated selection of the photo icon 214d or the text icon 214f, the displayed content object selection window 212e would instead include available content objects associated with photos or textual characters, respectively. The user 10 may provide the content object type input via touch, stylus, mouse/cursor, gesture, or speech.

FIG. 2 also shows the graphical user interface 210 having additional windows 212c. 212d that allow the user 10 to add or to modify/manipulate content (e.g., graphical objects 220) displayed in the virtual canvas window 212a or to perform various commands related to the design generating program (i.e., the designer) 200. For instance, the graphical user interface 210 may include a command window 212c providing various commands that govern functions of the designer, such as an accept command to ensure that a user 10 wants to perform a particular action or function selected. Here, the user 10 may select a "done" icon 214c in the command window 212c to provide the accept command. The command window 212c may further include cancel and edit icons 212a, 214b that permit the user to cancel a particular selection and edit a graphical design 202. By having command icons 214, the user interface 210 may navigate between windows 212 or know when functionality related to a particular window 212 is complete (e.g., to return the user 10 to the canvas window 212a).

FIGS. 3 and 4 show the content object selection window 212e including the available content objects (e.g., shapes) 220 that the user 10 may select from for presentation in the virtual canvas window 212a. Here, the design generating program 200 is configured to receive, in the content object selection window 212e, a first selection input from the user 10 indicating selection of a first content object 220 that includes a circle shape and a second selection input from the user 10 indicating selection of a second content object 220 that includes a star shape (not shown). The design generating program 200 may receive any number of selection inputs to select any number of content objects for presentation in the virtual canvas window 212a.

Optionally, the design generating program 200 may superimpose an available action menu 216 on the content objection selection window 212e that presents one or more action icons 214, 214h-k each associated with a respective action to perform on a material using a selected content object 220. FIGS. 3 and 4 show the available action menu 216 disposed above the available content objects 220 rendered in the window 212e of the graphical user interface 210. One action, selected in FIG. 3 and represented by icon 214h with a shaded pair of scissors, performs a "cut" action when selected by the user 10 so that the content object (i.e., circle shape) 220a selected via the selection input represents a positive space of material to be cut by the cutting machine 130 from the material using the corresponding content object 220a. Here, a positive space of material refers to an amount of material (e.g., an area corresponding to a shape) that will remain or still be present after the post-processing operation (e.g., the cutting of the cutting machine 130). In contrast, and as shown in FIG. 4, the user 10 may select another action within the available action menu 216 that is by un-shaded scissors icon 214, 214i. When the user 10 selects this icon 214i, the designer 200 applies a "cut-out" action to each available content object (e.g., shape) 220 presented in the content object selection window 212e, thereby resulting in each shape being a negative space of material that is removed from the surrounding material by the cutting machine 130.

Figure 5:
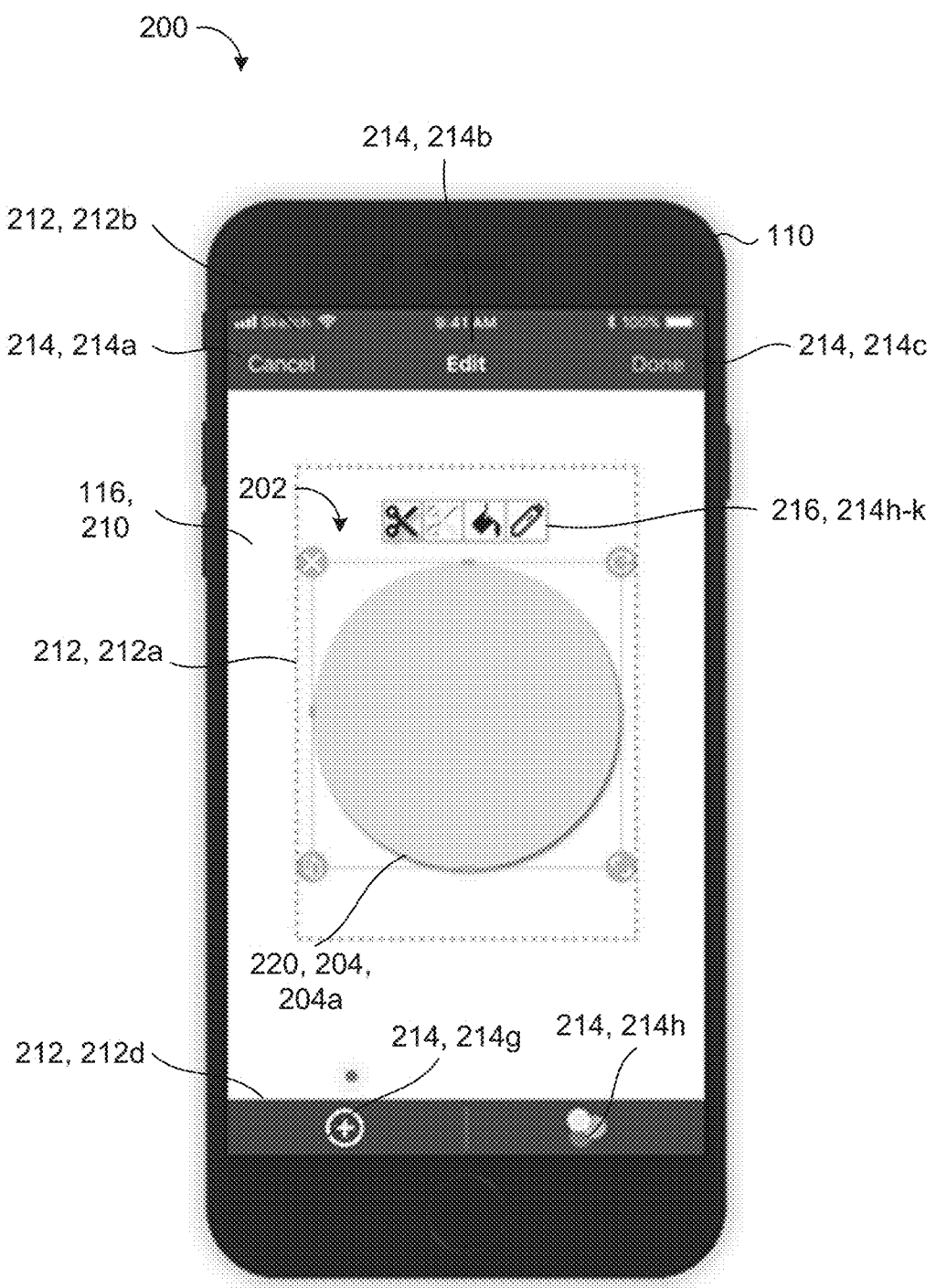
FIGS. 5 and 6 are schematic views of example graphical user interfaces having one or more content objects displayed in the virtual canvas window and superimposed on respective visual layers, in accordance with various embodiments.
Figure 6:
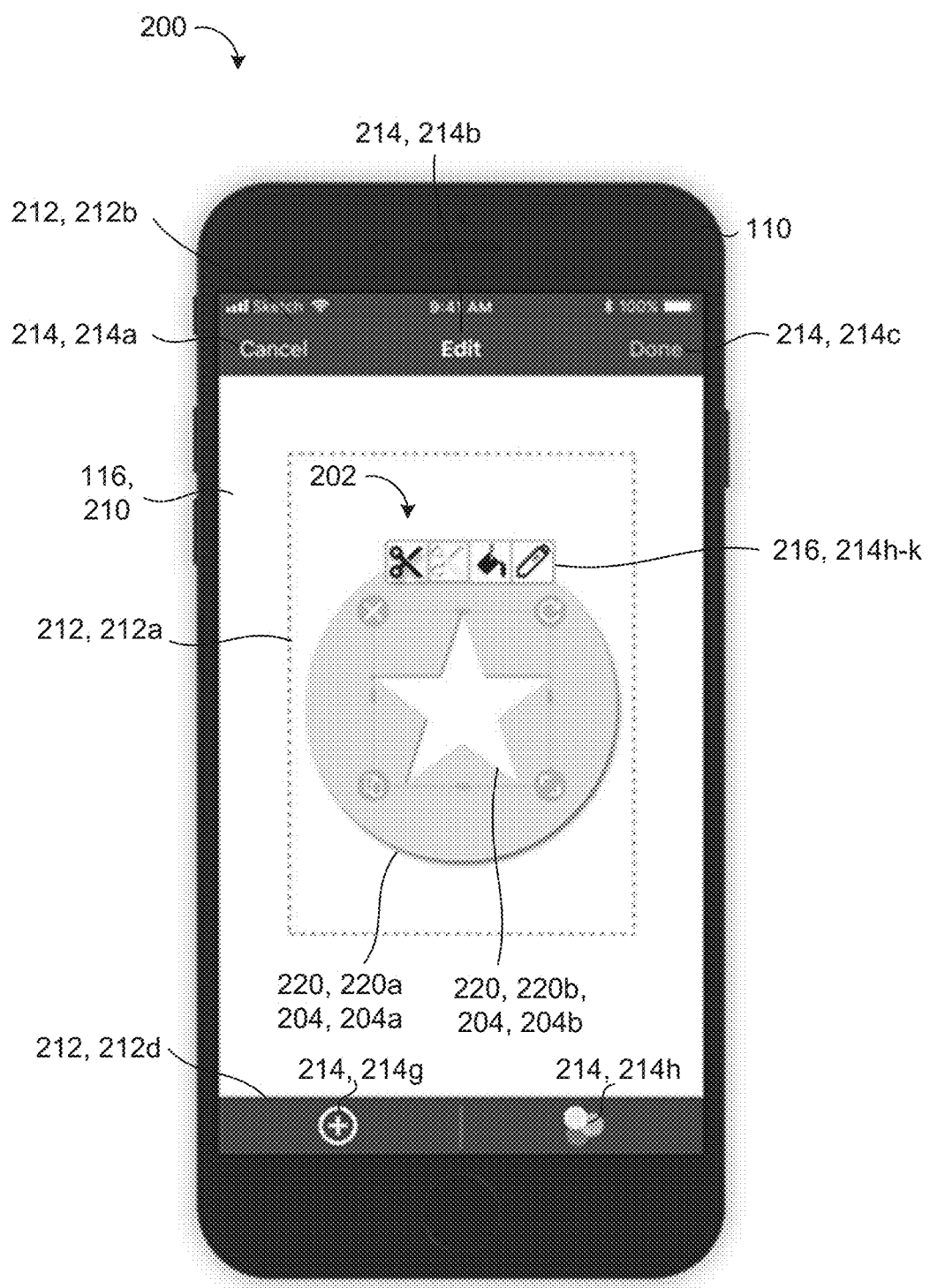

After receiving the selection inputs, the design generating program 200 is configured to display the first and second content objects 220 in the virtual canvas window 212*a*. For instance, FIG. 5 shows the first content object 220*a* that includes the circle displayed in the virtual canvas window 212*a* and FIG. 6 shows both the first content object 220*a* that includes the circle shape, and the second content object 220*b* that includes the star shape, displayed in the virtual canvas window 212*a*. In some implementations, for each corresponding content object among the first and second content objects 220*a*, 220*b* displayed in the virtual canvas window 212*a*, the designer 200 is further configured to assign a respective set of available actions to perform on the material using the corresponding one of the first content object 220*a* or the second content object 220*b* displayed in the virtual canvas window 212*a*. The designer 200 may then selectively display, in the graphical user interface 210, a respective available action menu 216 superimposed on the virtual canvas window 212*a* adjacent to the corresponding one of the first content object 220*a* or the second content object 220*b*. Each respective available action menu 216 selectively displayed presents one or more corresponding action icons 214, 214*h-k* each associated with a respective action from the respective set of available actions. In the examples shown, the action icons 214 include a cutting icon 214*h* represented by a shaded pair of scissors, a cut-out icon 214*i* represented by an un-shaded pair of scissors, a fill icon 214*j*, and an erase icon 214*k*.

The designer 200 may be further configured to select (e.g., receive action input from a user), from the respective set of available actions assigned to the corresponding one of the first content object 220*a* or the second content object 220*b*, one of the actions to perform on the material using the corresponding content object 220. Thereafter, and in response to receiving/selecting the one of the actions to perform, the designer 200 may augment, in the graphical user interface 210, the action icon 214, 214*h-k* among the one or more action icons 214 presented in the displayed respective available action menu 216 that is associated with the selected one of the actions to perform on the material. For instance, FIG. 5 shows augmenting the icon 214*h* represented by shaded pair of scissors to perform a "cut" action when selected so that the content object (i.e., circle shape) 220*a* selected via the selection input represents a positive space of material to be cut by the cutting machine 130. Likewise, FIG. 6 shows augmenting the icon 214*i* represented by the unshaded pair of scissors to perform a "cut-out" action when selected so that the content object (i.e., star shape) 220*b* selected via the selection input represents a negative space of material to be cut-out and removed by the cutting machine 130. In these examples, augmenting the icons 214*h*, 214*i* includes highlighting or visually distinguishing the icon 214*h*, 214*i* from the other icons in the available action menu 216 in some manner so that the user 10 can ascertain the selected icon 214*h*, 214*i*.

In some examples, the designer 200 is configured to display the respective available action menu 216 for each of the displayed first and second content objects 220*a*, 220*b* in response to receiving a manipulation input from the user 10 indicating selection of the corresponding content object 220*a*, 220*b* to manipulate the corresponding content object 220*a*, 220*b* while displayed in the virtual canvas window 212*a*. For instance, the user 10 may provide a manipulation input to select the first content object 220*a* displayed in the virtual canvas window 212*a* of FIG. 5, whereby the designer 200 may responsively display the respective available action menu 216 and corresponding action icons 214*h-k* superimposed on the virtual canvas window 212*a* adjacent to the first content object 220*a*. Similarly, the user 10 may provide a manipulation input to select the second content object 220*b* displayed in the virtual canvas window 212*a* of FIG. 6, whereby the designer 200 may responsively display the respective available action menu 216 and corresponding action icons 214*h-k* superimposed on the virtual canvas window 212*a* adjacent to the first content object 220*a*.

In some implementations, the designer (i.e., design generating program) 200 is configured to select the one of the actions from the respective set of available actions in response to receiving, in the graphical user interface 210, an action selection input from the user 10 indicating selection of the action icon 214*h-k* presented in the displayed respective available action menu 216 that is associated with the respective action. For instance, FIG. 5 shows that the user 10 may provide an action selection input to select the icon 214*h* represented by shaded pair of scissors to perform the "cut" action for providing a positive space of material in the shape of the circle. FIG. 6 shows that the user 10 may provide an action selection input to select the icon 214*i* represented by the unshaded pair of scissors to perform the "cut-out" action for providing a negative space to be cut-out from the material in the shape of a star.

In additional implementations, the designer 200 is configured to obtain context information associated with the first and second content objects 220*a*, 220*b* displayed in the virtual canvas window 212*a*. Here, the available actions in the respective set of available actions assigned to each corresponding content object 220 among the first and second content objects 220*a*, 220*b* dynamically updates based on the obtained context information. The context information may include, without limitation, at least one of the relative positions of the first and second content objects 220 displayed in the virtual canvas window 212*a*, a dimension/size/orientation of each of the first and second content objects 220 displayed in the virtual canvas window 212*a*, a respective content object type associated with each of the first and second content objects any actions to perform on the material that are currently selected for the first content object and/or the second object, properties of the material, or a type of machine to be employed for creating the unique design 202 on the material. For example, with reference to FIG. 6, when the relative positions of the first and second content objects 220*a*, 220*b* displayed in the virtual canvas window 212*a* are at least partially overlapping and the "cut" action to perform on the material using the first content object (e.g., the circle shape) 220*a* is affirmatively selected, the "cut-out" action to perform on the material using the second content object (e.g., the star shape) 220*b* may only be available for selection when the dimension/size of the circle shape 220*a* is larger than the star shape 220*b*. Intuitively, this follows the notion that a negative space of material having the star shape 220*b* could only be cut-out and removed by the cutting machine 130 from the positive space of material having the circle shape 220*a* when at least a portion of the start shape 220*b* can be encompassed by the circle shape 220*a*. As such, a manipulation input from the user 10 indicating selection of the star shape 220*b* to enlarge the dimensions/size of the star shape 220*b* and/or a manipulation input indicating selection of the circle shape 220*a* to reduce the dimensions/size of the circle shape 220*a* may cause respective set of available actions assigned to the start shape 220*b* to dynamically update so that the "cut-out" action and corresponding action icon 214*i* (e.g., unshaded scissors) are no longer available.

The designer 200 may additionally use the obtained context information to select the one of the actions to perform on the material using the corresponding content object 220 automatically without requiring the user 10 to provide an explicit input to select the one of the action icons 214*h*-*k* associated with the action the user 10 wants to be performed on the material. For example, in FIG. 6, the context information indicating that the star shape 220*b* positioned entirely inside the circle shape 220*a* and the "cut" action is currently selected for the circle shape 220*a* may enable the designer 200 to automatically select the "cut-out" action to be performed on the material using the star shape 220*b*. The automatic selection may be based on a confidence that the "cut-out" action is most likely action that a typical user would select to be performed using the star shape 220*b* based on the current context information. Of course, the user 10 is free to de-select an action that was selected automatically and select a different action from the set of available actions by providing an action selection input indicating selection of the action icon 214 presented in the available action menu that is associated with the different action.

Implementations herein are further directed toward the design generating program 200 displaying the first content object 220*a* in the virtual canvas window 212*a* by superimposing, in the graphical user interface 210, the first content object 220*a* on a first visual layer 204*a* (FIG. 5) for display in the virtual canvas window 212*a*, and displaying the second content object 220*b* in the virtual canvas window 212*a* by superimposing, in the graphical user interface 210, the second content object 220*b* on a second visual layer 204*b* (FIG. 6) for display in the virtual canvas window 212*a*. As will become apparent, the first and second content objects 220*a*, 220*b* superimposed on the respective ones of the first and second visual layers 204*a*, 204*b* are capable of being manipulated independent from one another while displayed in the virtual canvas window 212*a*.

An object 220 displayed in the canvas window 212*a* may be automatically or manually assigned to a respective visual layer 204. A visual layer generally refers to a way of separating content objects without interacting or mixing content between the layers. Instead of mixing the content objects of each layer together, more than one layer forms a stack where overlaying one layer of the stack in front of or behind another layer of the stack generates an overall design effect without having intermix particular content objects 220. Each layer 204 may then be individually managed during editing or other design processing. In this way, the object 220, as it resides in its own graphical layer 204, can be changed and manipulated after it is placed on within the canvas window 212*a*. However, in examples scenarios, each layer 204 contains multiple objects 220, where actions and manipulations directed toward a layer are performed on all the objects 220 assigned to, and superimposed on, the layer 204.

FIG. 6 shows the designer 200 receiving, in the virtual canvas window 212*a*, manipulation inputs from the user 10 to move the first content object 220*a* or the second content object 220*b* to a target position in the virtual canvas window 212*a* relative to the other one of the first content object 220*a* or the second content object 220*b* displayed in the virtual canvas window. Here, the corresponding actions for the circle shape 220*a* and star shape 220*b* are selected (e.g., automatically based on context information or via action selection inputs selecting icons 214) as discussed above and with at least the second visual layer 204*b* being displayed. As shown, the star shape 220*b* is selected so that a user 10 can manipulate the star shape 220*b* within the virtual canvas window 212*a* in its own layer 204*b* over, below, or around the circle 220*a*. Further, the cut-out action has been selected using the cut-out action icon 214*i* so that the star 220*b* represents negative space to be cut from the positive space represented by the circle 220*a*.

In some examples, the second visual layer 204*b* provides user-selectable options to provide manipulation inputs such as an "X" graphical element to delete/remove the layer 204*b* and corresponding content object 220*b* from display in the virtual canvas window 212*a*, a rotation graphical element to rotate the content object 220*b*, a sizing graphical input to enlarge/reduce the size of the content object, and a duplication graphical element to duplicate the content object 220*b*. While the examples represent each of the visual layers 204 as a respective outline graphic including a dashed box surrounding the corresponding content object 220, the visual layers 204 may additionally or alternatively represent each visual layer 204 as a respective outline graphic that follows/outlines a contour of the corresponding content object 220. For example, an outline graphic 204*a* following the contour of the circle shape 220*a* may include a first color and an outline graphic 204*b* following the contour of the star shape 220*b* may include a different second color. As such, each visual layer 204 may be visually distinct from one another to convey that the content objects 220 are superimposed on distinct visual layers 204

Figure 7:
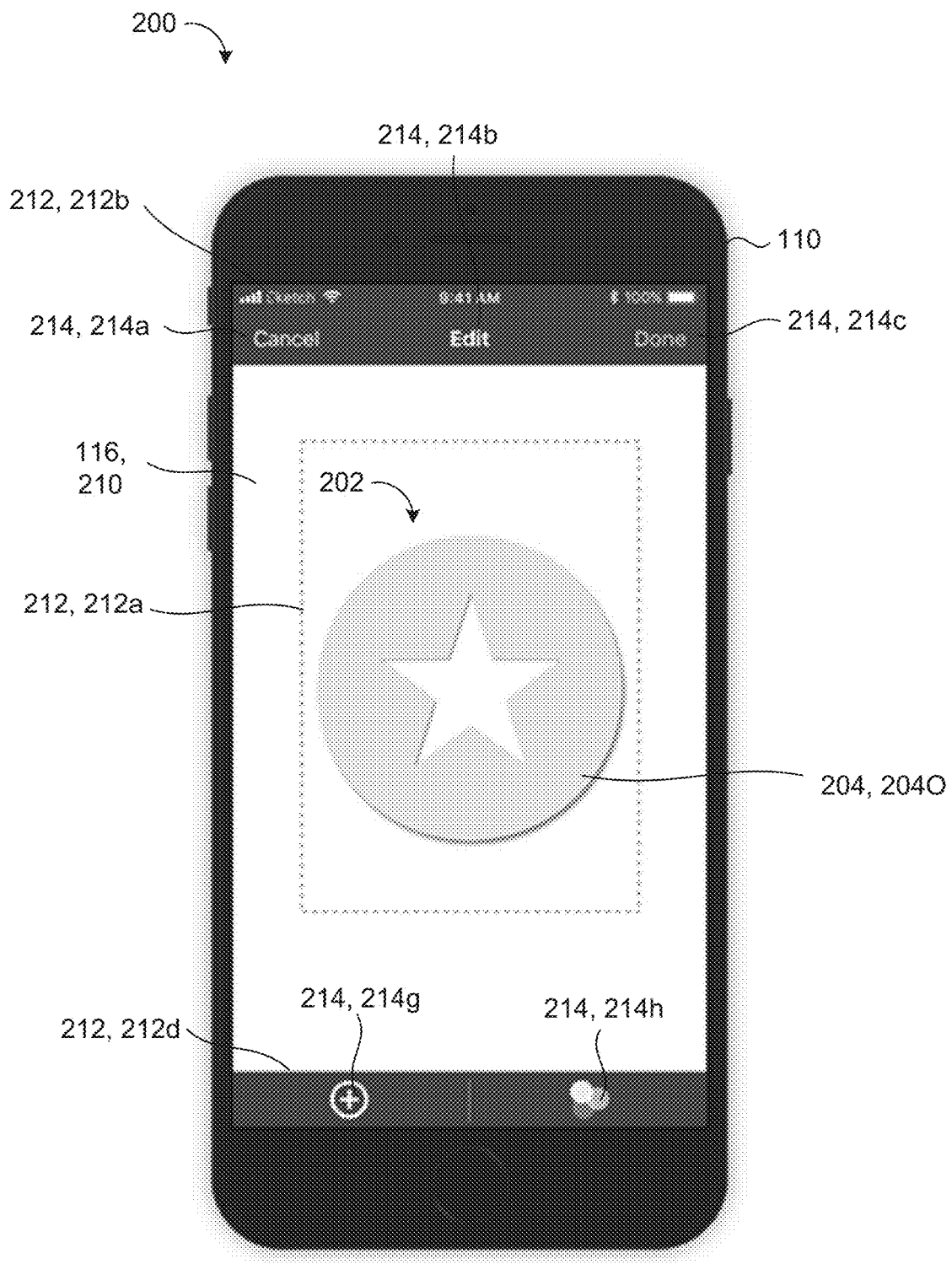
FIG. 7 is a schematic view of an example graphical user interface having a unique design generated by combining content objects, in accordance with various embodiments.
Figure 8:
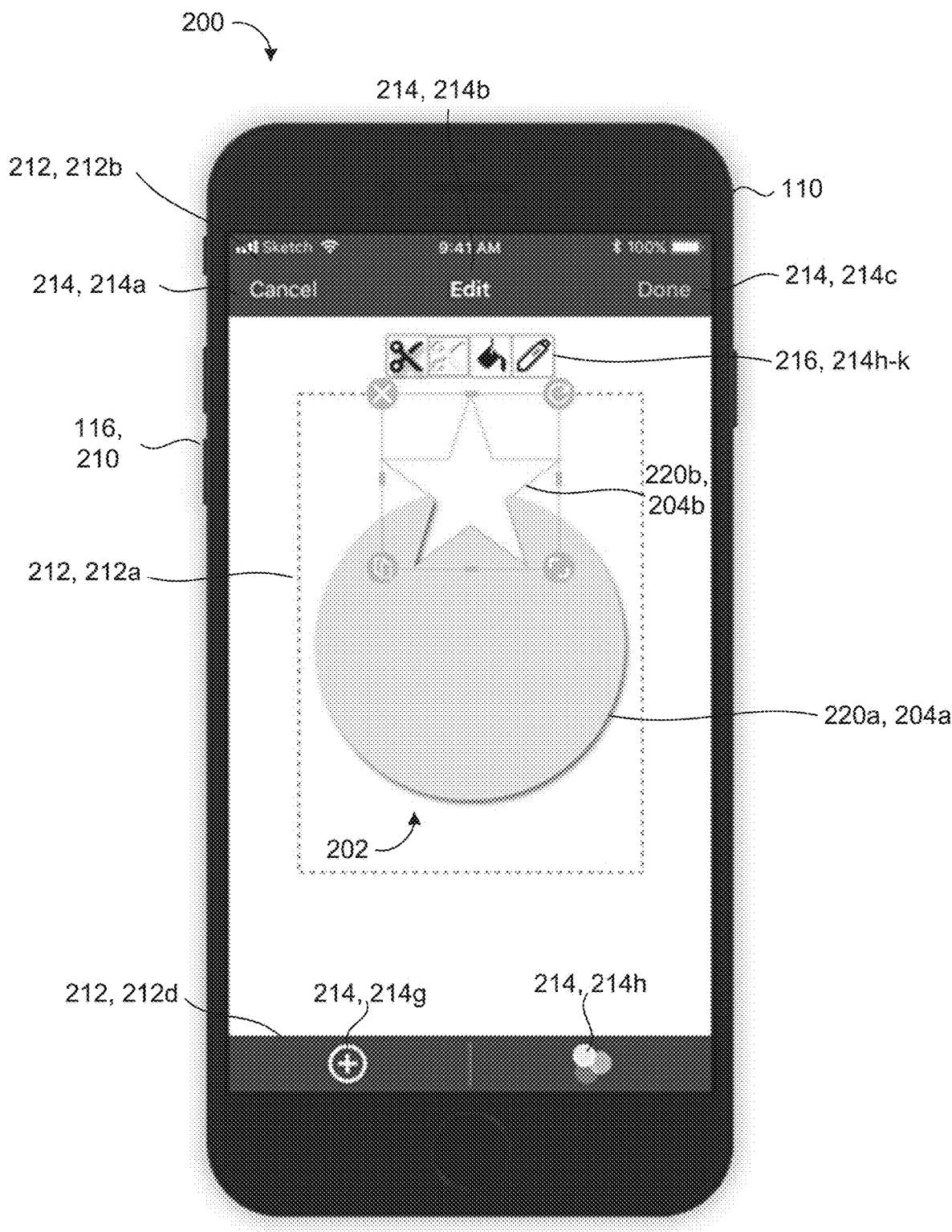
FIGS. 8-10 are schematic views of example graphical user interfaces having content objects displayed in a virtual canvas window, in accordance with various embodiments.
Figure 9:
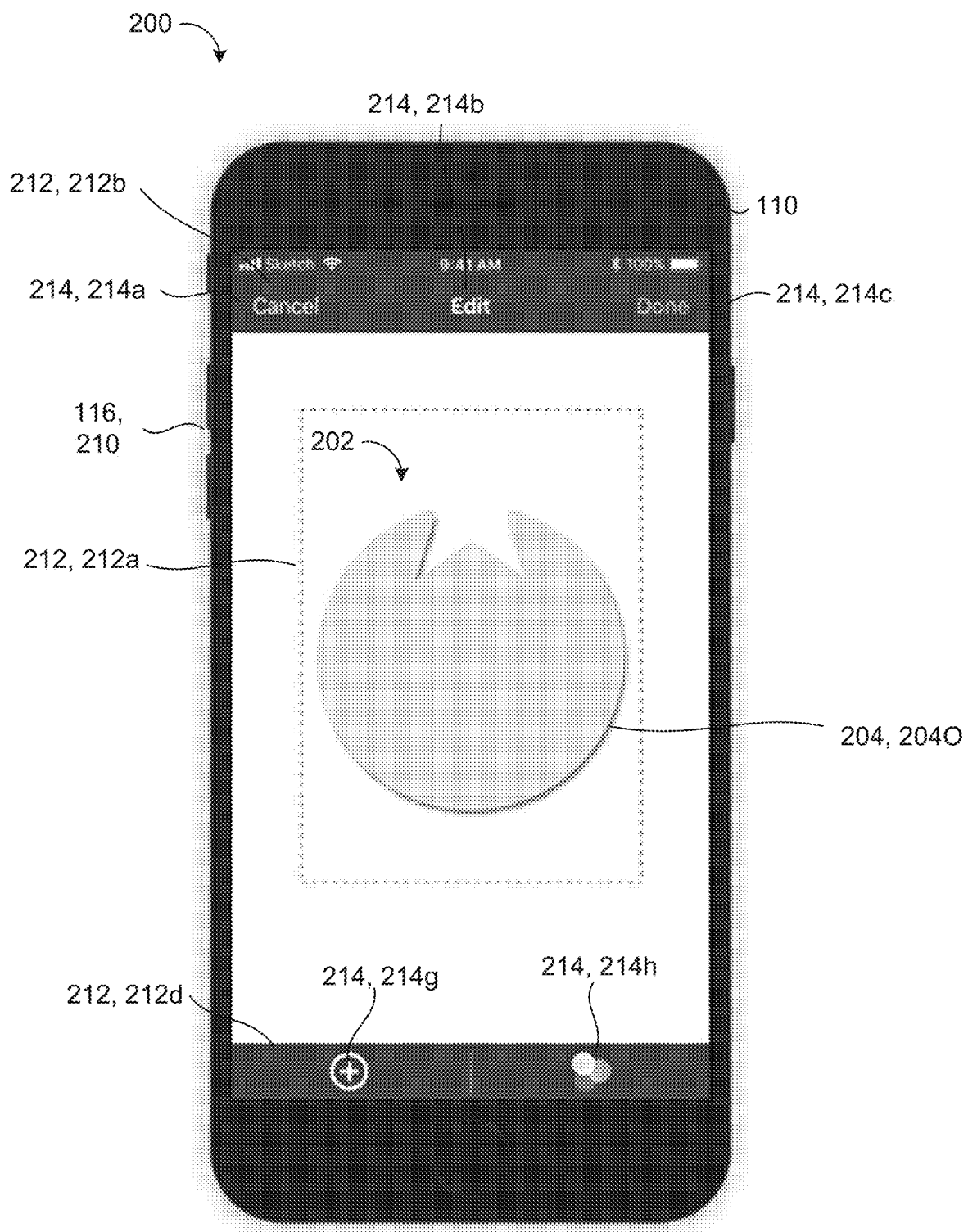
Figure 10:
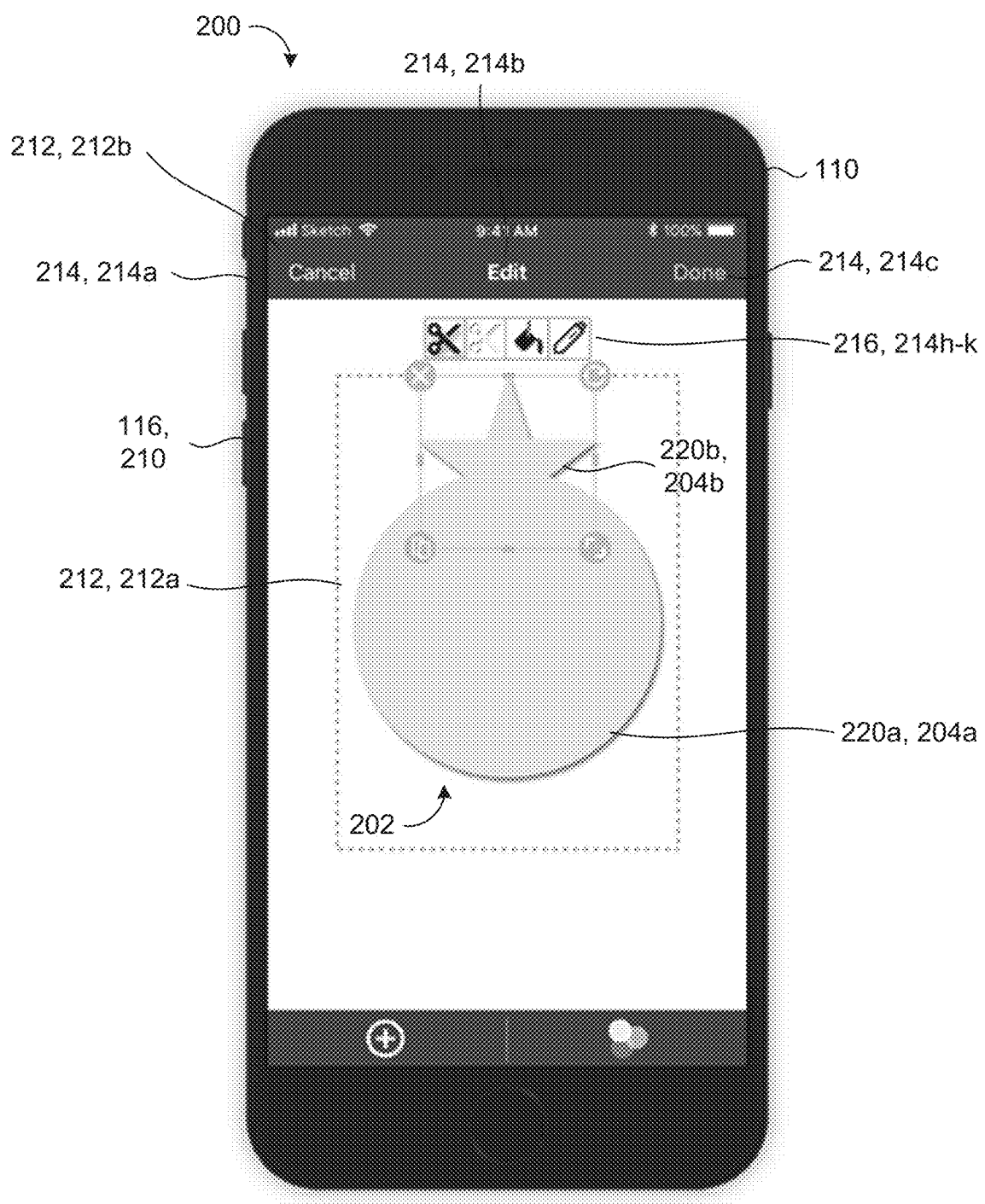
Figure 11:
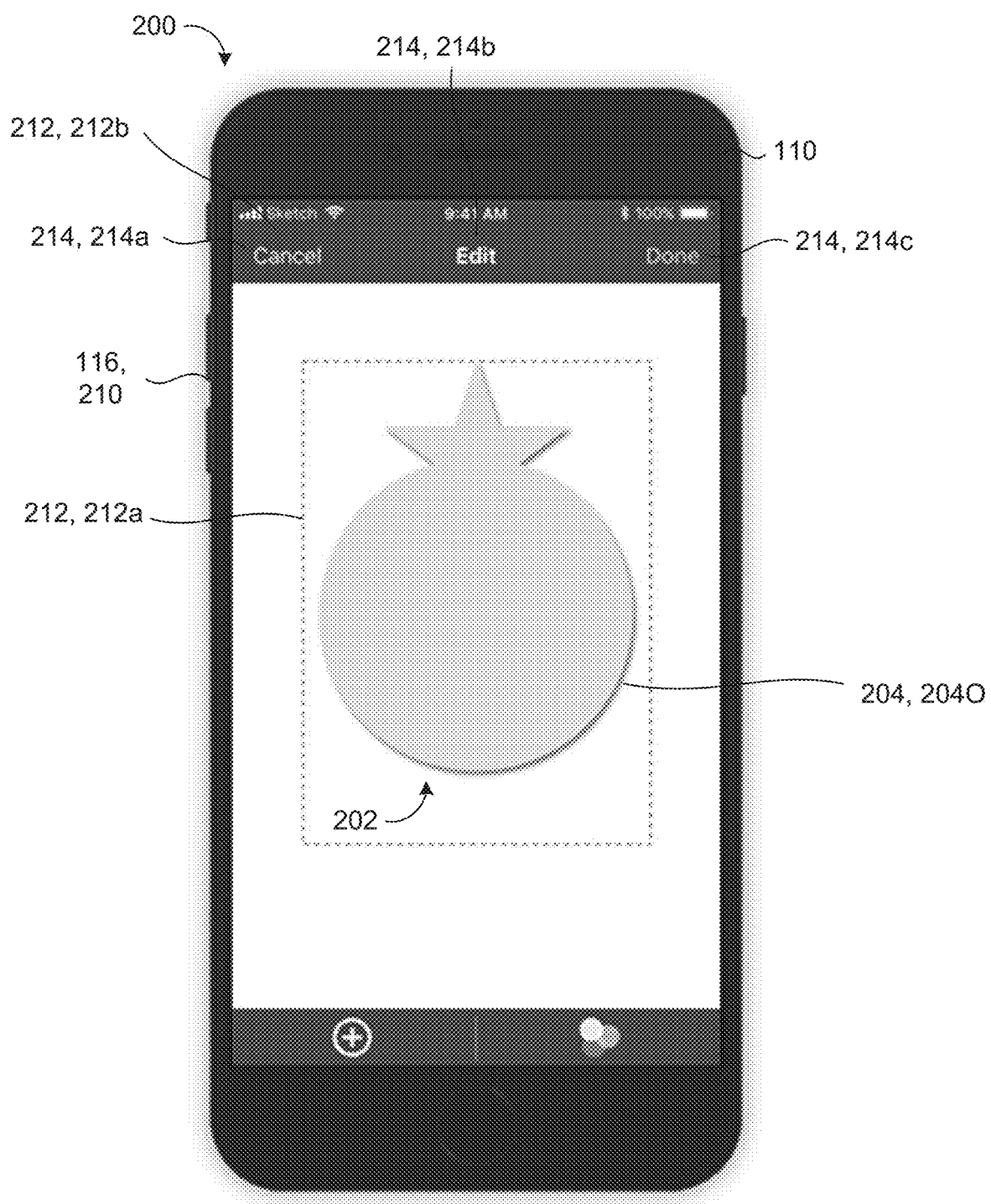
FIGS. 11-13 are schematic views of example graphical user interfaces having a unique design generated by combining content objects, in accordance with various embodiments.

Based on the first content object 220*a* and the second content object 220*b* overlapping when the first content object or second content object is moved to the target position indicated in FIG. 6, the designer 200 may generate, for display in the virtual canvas window 212*a*, the unique design 202 by combining respective portions of the first content object 220*a* and the second content object 220*b*. The designer 200 may generate the unique design 202 responsive to an affirmative input provided by the user to generate the unique design 202 or automatically based on context information such that a union operation is performed to "weld" respective portions of the content objects 220. Notably, when generating the unique design 202, FIG. 7 shows the designer 200 superimposing the unique design 202 on a flattened output layer 2040 by combining the first and second visual layers 204*a*, 204*b*. The unique design superimposed on the single, flattened output layer 2040 visually depicts how the unique design 202 would appear when cut from a material by a cutting machine 130. In this way, the user 10 can manipulate each object/shape 220*a*, 220*b* independently within separate layers 204*a*, 204*b* as shown in FIGS. 5 and 6, and thereafter, the designer 200 may automatically flatten or "fuses" the distinct layers 204 (e.g., without any flattening command or input by the user 10) so that the respective portions of the various objects 220*a*, 220*a* are combined as depicted in the virtual canvas window 212*a* to appear in a single layer 2040. The visual depiction of this fusion or flattening of layers 204 occurs in real-time. By flattening the layers 204 within the canvas window 212*a* when the user 10 is/is not providing manipulation inputs directed toward the content objects superimposed on the layers 204, the user 10 can visualize the depiction of the design 202 rendered in the virtual canvas window 212*a* as it will appear when cut with an electronic cutting machine 130. Stated differently, the designer 200 is engaged in an automatic flattening mode where objects 220 on the virtual window 212*a* are visually displayed to the user 10 as objects/layers flattened together (e.g., as shown in FIGS. 7, 9, and 11) even when the user 10 may be editing or manipulating one or more layers/objects (e.g., as shown in FIGS. 6, 8, and 10)

Given a set of two or more layers 204 that are each coupled with an action and/or object, the layers 204 are flattened to create a deterministic output layer 2040 for consumption and creation by a cutting machine 130 (or other manufacturing machine). Users 10 can easily visualize the outcome of their design work by using the "cut" and "cut out" functions and combining objects 220. By selecting an icon 214 that visually represents the desired function, the user 10 can add to/modify shapes on the canvas (i.e., within the canvas window 212a) that either cut the substrate material into that shape, or remove material in that shape. In addition, overlaying these objects 220 creates a visual representation that fully simulates the end result. The user 10 need not manually fuse the objects 220.

The described real-time depiction of the design 202 is especially advantageous when designing unique graphics for cutting with a cutting machine 130. Cutting machines 130 plot graphics on a single layer of material at a time. Users 10 typically generate the design 202 in a multiple layer format. Due to fact that the cutting machine 130 operates on a single layer of material at a time and a user 10 often generates a design in a multiple layer format, the user 10 may have to manually flatten the design 202 to collapse the multiple layer format prior to communicating the design 202 to the cutting machine 130 or the cutting machine 130 may be configured to receive the multiple layer format and flatten it into a single layer for post-design processing. In either approach, the design 202 is flattened. Unfortunately, when the design 202 is flattened into a single layer for post-design processing, the flattening process may introduce potential error between what the user 10 intended for the design 202 to look like after post-design processing and the actual output flattened layer 2040. Therefore, the designer 200 has been designed to simplify the flattening of the layers 204 in order for users 10 to have a 'what you see is what you get' (WYSIWYG) experience. It can allow users 10 to modify layers 204 at any point during the design process and also have the flexibility to change its layering order or other associated design-based actions. Additionally, the designer 200 may generate drop shadows on the objects-being-cut to illustratively convey to the user 10 what is going to happen during post-design processing (e.g., cutting on the cutting machine 130). This prevents the user 10 from needing to use abstract tools such as weld tools, slice tools or attach tools that are often found in editing/design software of to achieve particular outcomes. The user 10 does not necessarily need to interact with layers 204 to achieve desired outcomes; avoiding often confusing multi-layer functions that can depend on order/sequences.

As the designer adds layers 204 corresponding to each content object 220 selected for presentation in the virtual canvas window 212a, the respective set of actions that are assigned to each content object may be applied to by the resulting flattened layer 2040 for creating the unique design 202 from the material. The actions can define up, down, or sibling (same depth) layered relationships and behaviors. This composition of these behaviors and layers 204 may be done in a deterministic way so you always get the same result given the same input. By continually fusing and flattening these layers 204 while a user 10 is designing, the fusion itself becomes part of the design process.

To further illustrate these advantages, FIGS. 8-11 depict further manipulations of the objects 220 and associated layers 204 described above. For example, as shown in FIG. 8, the user 10 can provide another manipulation input indicating selection of the star-shaped content object 220b to move the star-shaped content object 220b to a new position relative to the circle-shaped content object 220a. These objects 220 can be manipulated as if they resided in separate layers 204a, 204b, but depicted in real-time as a flattened layer 2040. When deselected, as shown in FIG. 9, both objects appear as a single flattened layer 2040 as they would when cut from a material by a cutting machine 130. This functionality enables users 10 visualize how different layers 204 having different actions assigned thereto will appear together as a flattened unique design 202 during the design process. While the illustrated graphic of a star and circle is provided for simplicity to demonstrate aspects of the present disclosure, the designer 200 will permit users 10 to create complicated designs 202 from a multitude of different content objects each superimposed on corresponding visual layers 204 and having different sets of available actions assigned thereto, such that real-time depiction of the flattened unique design 202 may be more advantageous to the user the more complicated the design 202.

To further illustrate the diverse applications made available by the above-described features of the present disclosure, FIGS. 10 and 11 illustrate a design 202 where the star 220b has been switched to a positive-space object 220 and the circle 220a remains a positive-space object 220. In other words, the user 10 selects the second layer 204b with the star shape 220b and selects the icon 214i on the available action menu 216 that changes the star shape 220b to a positive space while the circle shape 220a of the first layer 204a is unchanged. Once the user 10 makes this modification, the designer 200 automatically displays the star and circle shapes 220a, 220b in the canvas window 212a as a unique design 202 superimposed on an automatically flattened layer 2040.

Figure 12:
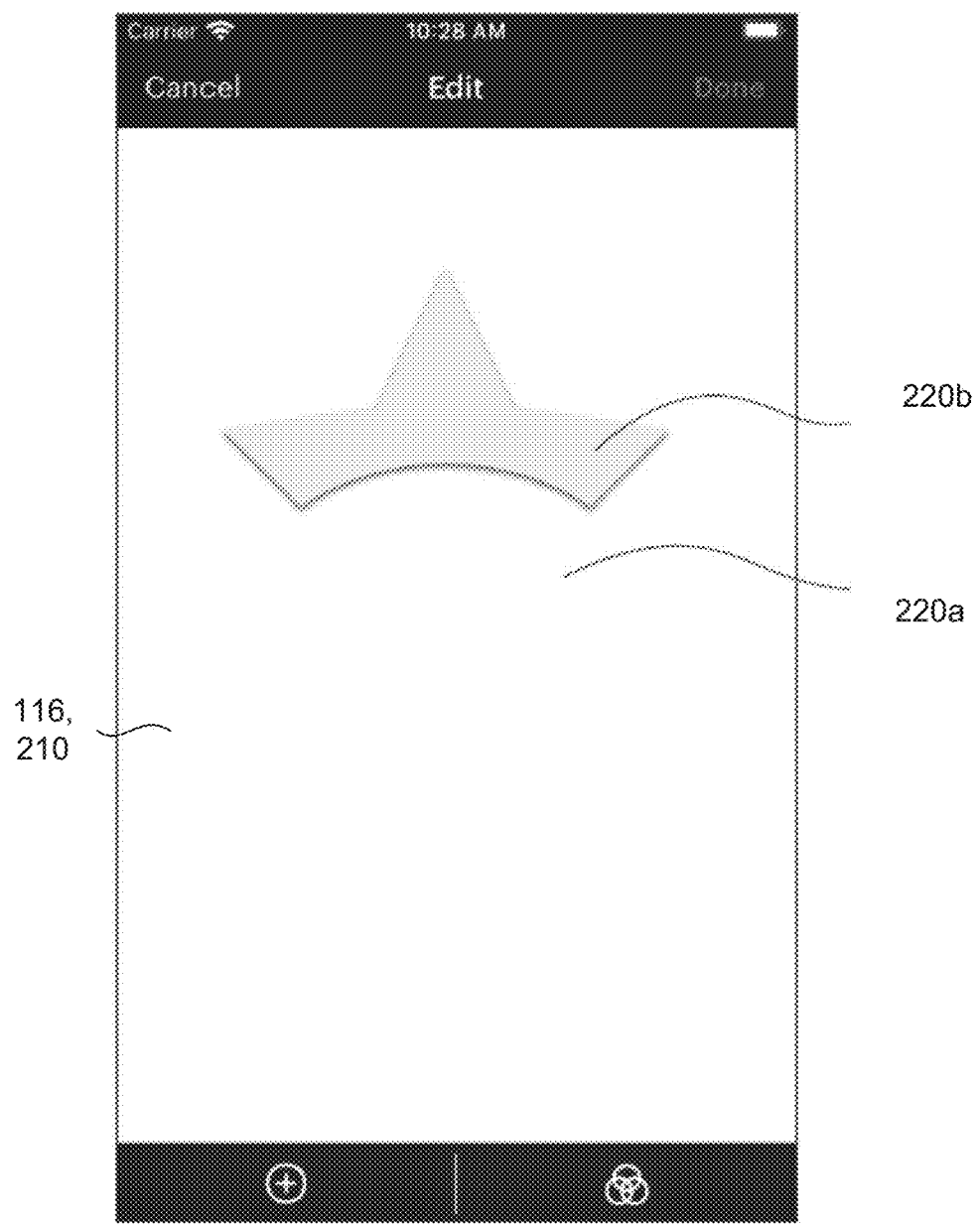
Figure 13:
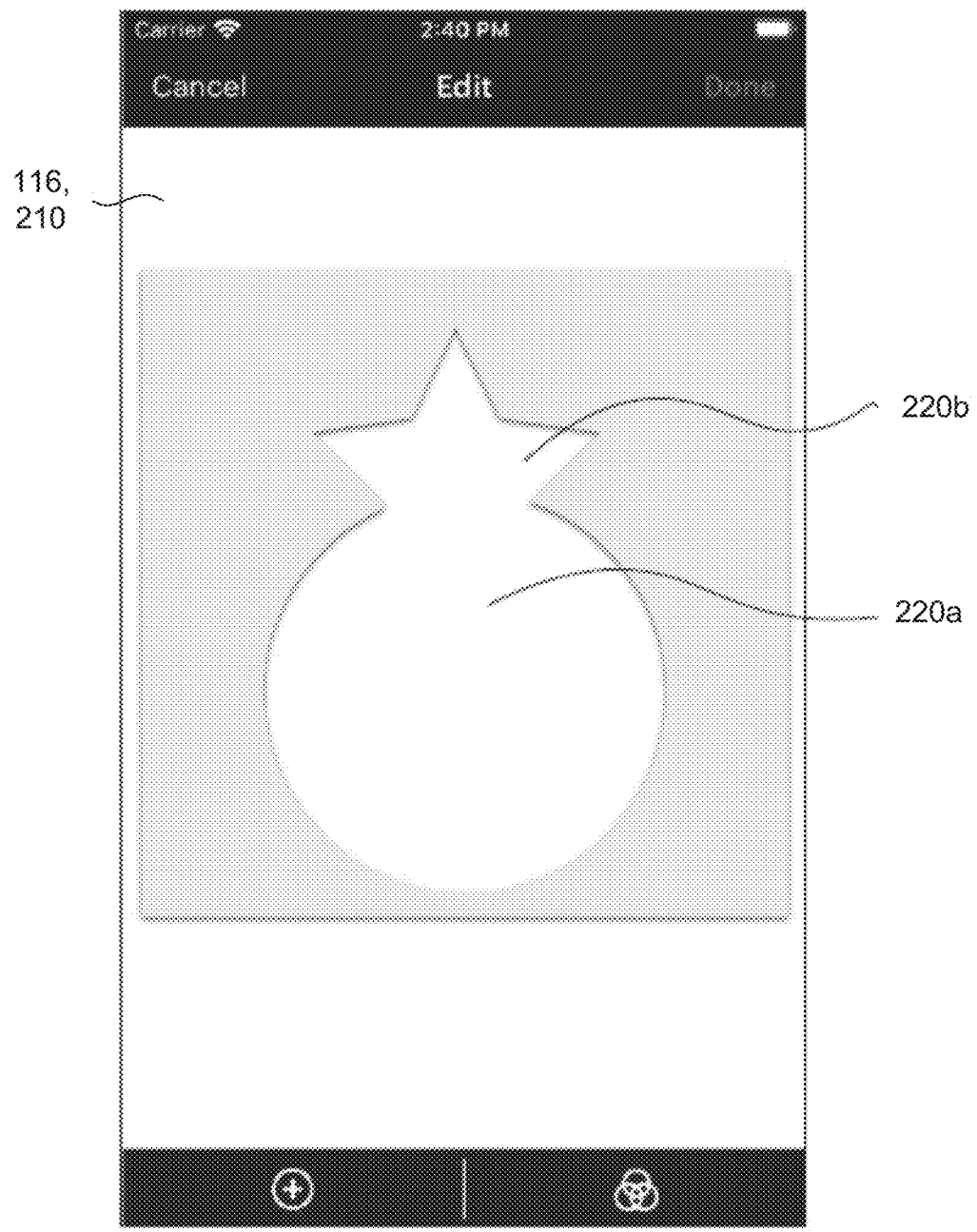

Alternatively, FIG. 12 shows manipulation inputs from the user selecting the star object 220b as a positive space and selecting circle object 220a as a negative space, while FIG. 13 shows manipulation inputs selecting both the star and circle objects 220a, 220b as a negative space. Notably, the design generating program permits multiple different combinations of positive-space objects 220 and negative-space objects 220 to be created on a material, as acted upon by cut and cut-out actions in the available action menu 216. These principles also apply to other actions performed on objects 220 by the selection of other tools, including cropping, filling, drawing, embossing, stitching, three-dimensional printing, etc.

In some implementations, the respective set of available actions for a given content object 220 are assigned to the corresponding visual layer 204 the given content object 220 is superimposed upon. Thus, the available actions can be shared, duplicated, or unique to each layer/action combination. Each layer 204 may have a depth that determines the order that actions take place. As each layer 204 is flattened, the current composed layer is then fused with the next layer until all layers have been consumed. Additionally or alternatively, the designer 200 may permit the user to provide additional manipulation inputs to select and modify different layers after the flattened output layer 2040 is generated. The graphical user interface 210 may further permit the ability to disable a layer so that the layer 204 and corresponding object 220 do not impact fusing and flattening other layers. In other words, disabling a layer 204 may result in omitting the corresponding content object 220 superimposed thereon from being included in the unique design 202.

Moreover, different combinations of actions assigned to subsets of different layers 204 can be cached to allow users 10 to change layers 204 and expedite combining/fusing of smaller pieces within layers. This optimization input may still permit a deterministic output the same as if the optimization were not applied.

The designer 200 described herein can offer the user 10 a choice among automatically generated variations, thus allowing the user 10 to be creatively inspired. Such variations may include a filter grid in a photo manipulation program. Generated variations can be provided for combinations of layers 204 and combination actions in a similar way. For example, if three objects 220 were positioned overlapping one another with three different combination actions available, a grid containing the twenty-seven possible combination options could be presented to inspire the user 10 with other ways to use the artwork or implement the user's design 202. This may be accomplished by incorporating a stack or some ordered collection of layers 204, whereby the action selected to be performed for each layer 204 may be looked-up as needed and each layer 204 is flattened from the bottom layer to the top layer.

Expanding on the notion of using context information for dynamically updating the set of actions available to a given content object and/or automatically selecting a given action, if the user 10 selects an action that causes subtraction of a first layer 204a from a second layer 204b, and the first layer 204a hangs over an edge of the second layer 204b, the first layer 204a still exists in its entirety, but only the part of the first layer 204a that intersects with the second layers 204b can be seen, since the empty space of the subtracted first layer 204a and the second layer 204b beneath the first layer 204a as well as the space that had no overlap is also empty and not visually identifiable. To solve this problem, the design generating program 200 can instruct the graphical user interface 210 to present invisible layers 204 with some indication of them existing without being visible in a traditional sense. This can be accomplished, for example, with dotted lines, alpha changes, shadows, or other visual mechanisms to show hidden or semi-hidden objects. There are also other representations of operations that can successfully communicate outcomes without requiring use of abstract operations. For example, the designer 200 may depict interior shapes that will "fall away," meaning they will not include any part of the final design if they are cut. One or more other implementations can include other visualizations that contribute to a user's understanding of outputs before any cutting instructions are sent to a cutting machine 130 or other type of manufacturing machine.

In various embodiments, the design generating program is configured to receive information pertaining to the properties of the material from a machine. For example, processing hardware may be configured to automatically determine properties of the material to be cut, milled, stitched, pressed, or otherwise modified, and these determined properties may be included in the context information described above.

Figure 14:
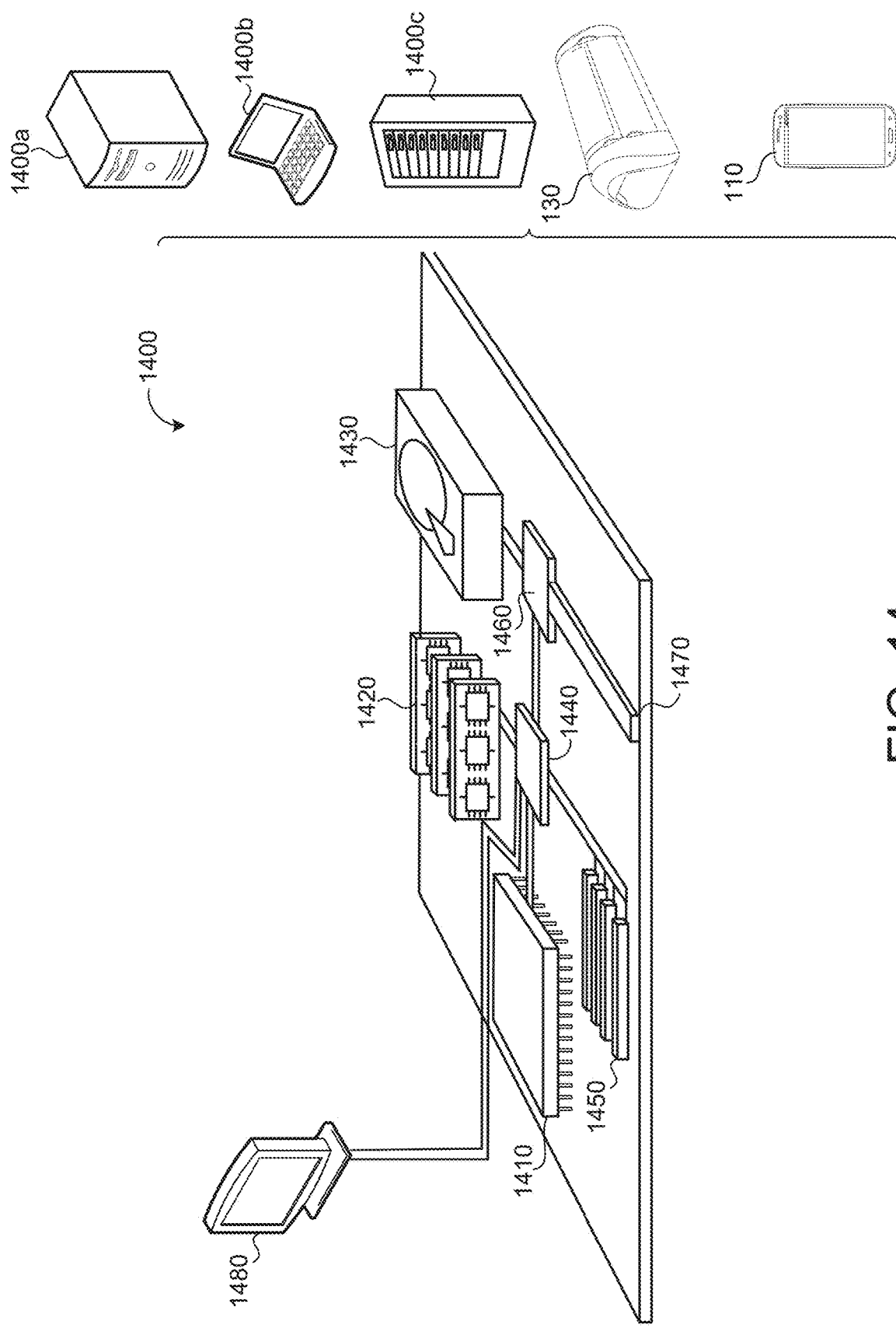
FIG. 14 is a schematic view of an example computing device that may be used to implement the systems and methods described herein, in accordance with various embodiments.

FIG. 14 is schematic view of an example computing device 1400 that may be used to implement the systems (e.g., the designer 200) and methods described in this document. The computing device 1400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 1400 includes a processor 1410 (e.g., data processing hardware), memory 1420 (e.g., memory hardware), a storage device 1430, a high-speed interface/controller 1440 connecting to the memory 1420 and high-speed expansion ports 1450, and a low speed interface/controller 1460 connecting to a low speed bus 1470 and a storage device 1430. Each of the components 1410, 1420, 1430, 1440, 1450, and 1460, are interconnected using various busses, and may be mounted on a common motherboard or in other manners as appropriate. The processor 1410 can process instructions for execution within the computing device 1400, including instructions stored in the memory 1420 or on the storage device 1430 to display graphical information for a graphical user interface (GUI) (e.g., the user interface 210) on an external input/output device (e.g., the user device 110), such as display 1480 coupled to high speed interface 1440. In other implementations, multiple processors and/or multiple buses may be used, as appropriate, along with multiple memories and types of memory. Also, multiple computing devices 1400 may be connected, with each device providing portions of the necessary operations (e.g., as a server bank, a group of blade servers, or a multi-processor system).

The memory 1420 stores information non-transitorily within the computing device 1400. The memory 1420 may be a computer-readable medium, a volatile memory unit(s), or non-volatile memory unit(s). The non-transitory memory 1420 may be physical devices used to store programs (e.g., sequences of instructions) or data (e.g., program state information) on a temporary or permanent basis for use by the computing device 1400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 1430 is capable of providing mass storage for the computing device 1400. In some implementations, the storage device 1430 is a computer-readable medium. In various different implementations, the storage device 1430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1420, the storage device 1430, or memory on processor 1410.

The high speed controller 1440 manages bandwidth-intensive operations for the computing device 1400, while the low speed controller 1460 manages lower bandwidth-intensive operations. Such allocation of duties is exemplary only. In some implementations, the high-speed controller 1440 is coupled to the memory 1420, the display 1480 (e.g., through a graphics processor or accelerator), and to the high-speed expansion ports 1450, which may accept various expansion cards (not shown). In some implementations, the low-speed controller 1460 is coupled to the storage device 1430 and a low-speed expansion port 1490. The low-speed expansion port 1490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 1400 may be implemented in a number of different forms, as shown in the figure. For example, it may be implemented as a standard server 1400*a* or multiple times in a group of such servers 1400*a*, as a laptop computer 1400*b*, as part of a rack server system 1400*c*, as the cutting machine 130 (or other post-design processing machine), or as the user device 110.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Figure 15:
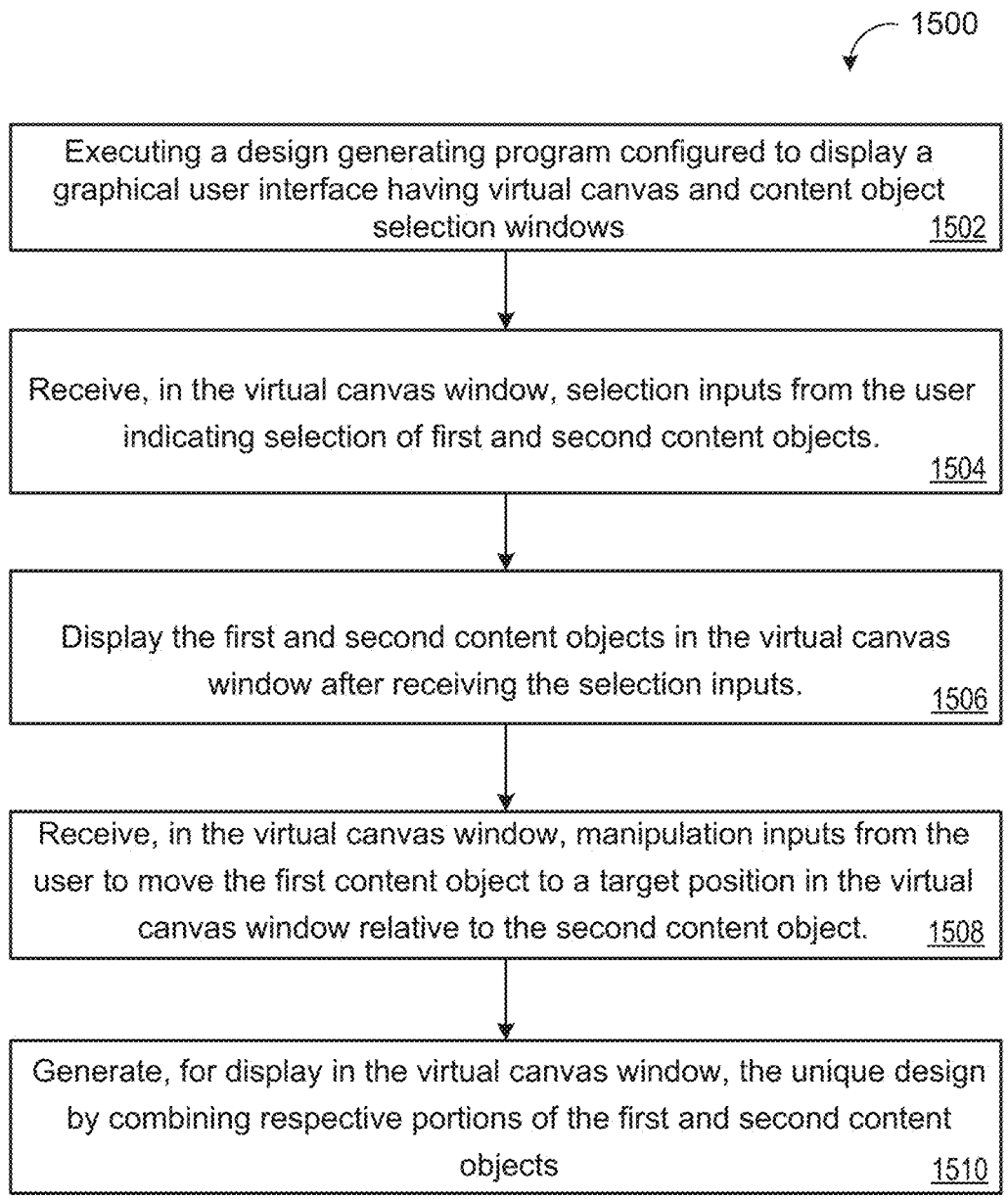
FIG. 15 is a flowchart of an example arrangement of operations for a method of creating a unique design, in accordance with various embodiments.

FIG. 15 provides a flowchart of an example arrangement of operations for a method 1500 of generating a unique design 202. The method 1500 may execute on the data processing hardware 112 of the user device 110 of FIG. 1. At operation 1502, the method 1500 includes executing a design generating program 200 configured to display on a screen 116 a graphical user interface 210 having a virtual canvas window 212*a* and a content object selection window 212*e*. The virtual canvas window 212*a* is configured to present one or more selected content objects 220 to be incorporated into the unique design 202. The content object selection window includes available content objects 220 to select from for presentation in the virtual canvas window 212*a*.

At operation 1504, the design generating program 200 is configured to receive, in the content object selection window 212*e*, selection inputs from the user 10 indicating selection of first and second content objects 220 from the available content objects. At operation 1506, the design generating program 200 is configured to display the first and second content objects 220 in the virtual canvas window 212*a* after receiving the selection inputs.

At operation 1508, the design generating program 200 is configured to receive, in the virtual canvas window 212*a*, manipulation inputs from the user to move the first content object 220*a* to a target position in the virtual canvas window 212*a* relative to the second content object 220*b* displayed in the virtual canvas window 212*a*. At operation 1510, and based on the first content object 220*a* and the second content object 220*b* overlapping when the first content object 220*a* is moved to the target position, the design generating program 200 is configured to generate, for display in the virtual canvas window 212*a*, the unique design 202 by combining respective portions of the first and second content objects 220.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user 10, one or more aspects of the disclosure can be implemented on a computer having a display device, e.g., a CRT (cathode ray tube), LCD (liquid crystal display) monitor, or touch screen (e.g., the display 116 of the user device 110) for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure.

Reference throughout this specification to features, advantages, or similar language does not imply that all of the features and advantages that may be realized with the present disclosure should be or are in any single embodiment of the invention. Rather, language referring to the features and advantages is understood to mean that a specific feature, advantage, or characteristic described in connection with an embodiment is included in at least one embodiment of the subject matter disclosed herein. Thus, discussion of the features and advantages, and similar language, throughout this specification may, but do not necessarily, refer to the same embodiment.

Furthermore, the described features, advantages, and characteristics of the disclosure may be combined in any suitable manner in one or more embodiments. One skilled in the relevant art will recognize that the subject matter of the present application may be practiced without one or more of the specific features or advantages of a particular embodiment. In other instances, additional features and advantages may be recognized in certain embodiments that may not be present in all embodiments of the disclosure. Further, in some instances, well-known structures, materials, or operations are not shown or described in detail to avoid obscuring aspects of the subject matter of the present disclosure. No claim element is intended to invoke 35 U.S.C. 112(f) unless the element is expressly recited using the phrase "means for."

The scope of the disclosure is to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. Further, the term "plurality" can be defined as "at least two." As used herein, the phrase "at least one of", when used with a list of items, means different combinations of one or more of the listed items may be used and only one of the items in the list may be needed. The item may be a particular object, thing, or category. Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A, B, and C. In some cases, "at least one of item A, item B, and item C" may mean, for example, without limitation, two of item A, one of item B, and ten of item C; four of item B and seven of item C; or some other suitable combination.

All ranges and ratio limits disclosed herein may be combined. Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

The schematic flow chart diagrams included herein are generally set forth as logical flow chart diagrams. As such, the depicted order and labeled steps are indicative of one or more embodiments of the presented method. The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. Other steps and methods may be conceived that are equivalent in function, logic, or effect to one or more steps, or portions thereof, of the illustrated method.

Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown. Furthermore, no element, component, or method step in the present disclosure is intended to be dedicated to the public regardless of whether the element, component, or method step is explicitly recited in the claims.

The subject matter of the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A computer-implemented method when executed on data processing hardware causes the data processing hardware to perform operations comprising:
executing a design generating program configured to display on a screen in communication with the data processing hardware a graphical user interface having:
a virtual canvas window configured to present one or more selected content objects to be incorporated into a unique design; and
a content object selection window comprising available content objects to select from for presentation in the virtual canvas window, wherein the design generating program is configured to:
receive, in the content object selection window, selection inputs from a user indicating:
selection of a first content object from the available content objects; and
selection of a second content object from the available content objects;
after receiving the selection inputs, display the first and second content objects in the virtual canvas window;
for each corresponding content object among the first and second content objects displayed in the virtual canvas window, assign a respective set of available actions to perform on the material using the corresponding content object, the respective set of available actions comprising a cut action to perform on the material using the corresponding content object and a cut-out action to perform on the material using the corresponding content object;
receive, in the virtual canvas window, a first manipulation input from the user indicating selection of the first content object to manipulate the first content object while displayed in the virtual canvas window;
in response to receiving the first manipulation input, display, in the virtual canvas window, a first available action menu superimposed on the virtual canvas window adjacent to the first content object, the first available action menu presenting two or more action icons each associated with a respective action from the respective set of available actions assigned to the first content object;
receive, in the virtual canvas window, a first action selection input from the user indicating selection of a cut action icon among the two or more action icons presented in the displayed first available action menu that is associated with the respective action;
in response to receiving the first action selection input from the user indicating selection of the cut action icon, select, from the respective set of available actions assigned to the first content object, the cut action to be performed on the material using the first content object, the first content object representing a positive space of the material based on the selection of the cut action, the positive space of the material corresponding to an area of the first content object that will remain after the cut action is performed on the material;
receive, in the virtual canvas window, a second manipulation input from the user indicating selection of the second content object to move the second content object to a target position in the virtual canvas window relative to the first content object displayed in the virtual canvas window;
based on the selection of the cut action to be performed on the material using the first content object and based on the first content object and the second content object overlapping when the second content object is moved to the target position:
dynamically update the respective set of available actions assigned to the second content object so that the cut action to perform on the material using the second content object is no longer available; and
display, in the virtual canvas window, a second available action menu superimposed on the virtual canvas window adjacent to the second content object, the second available action menu presenting a cut-out action icon associated with the cut-out action from the dynamically updated respective set of available actions assigned to the second content object;
receive, in the virtual canvas window, a second action selection input from the user indicating selection of the cut-out action icon presented in the displayed second available action menu that is associated with the cut-out action;
in response to receiving the second action selection input from the user indicating selection of the cut-out action icon, select, from the dynamically updated respective set of available actions assigned to the second content object, the cut-out action to be performed on the material using the second content object, the second object representing a negative space of the material based on the selection of the cut-out action, the negative space of the material corresponding to an area of the second content object that will be removed from surrounding portions of the material after the cut-out action is performed on the material; and
generate, for display in the virtual canvas window, the unique design by combining, based on the cut action and the cut-out action, respective portions of the first content object and the second content object.

2. The computer-implemented method of claim 1, wherein the available content objects comprise at least one of shapes, text characters/symbols, and photos.

3. The computer-implemented method of claim 1, wherein:
the graphical user interface displayed on the screen further has a content type selection window including one or more content icons each associated with a respective content object type; and
the design generating program is further configured to:
receive, in the content type selection window, a content object type input from the user indicating selection of one of the content icons; and
in response to receiving the content object type input, display, in the graphical user interface, the content object selection window comprising the available content objects to select from for presentation in the virtual canvas window, each available content object comprising the respective content object type associated with the selected one of the content icons.

4. The computer-implemented method of claim 1, wherein the design generating program displays the first and second content objects in the virtual canvas window by:
superimposing, in the graphical user interface, the first content object on a first visual layer for display in the virtual canvas window; and
superimposing, in the graphical user interface, the second content object on a second visual layer for display in the virtual canvas layer, the second content object superimposed on the second visual layer and the first content object superimposed on the first visual layer capable of being manipulated independent from one another while displayed in the virtual canvas window.

5. The computer-implemented method of claim 4, wherein the design generating program is further configured to, when generating the unique design by combining the respective portions of the first content object and the second content object, superimpose the unique design on a flattened output layer for display in the virtual canvas window, the flattened output layer generated by combining the first visual layer and the second visual layer.

6. The computer-implemented method of claim 4, wherein the design generating program is further configured to:
represent the first visual layer as a first outline graphic surrounding the first content object superimposed on the first visual layer; and
represent the second visual layer as a second outline graphic surrounding the second content object superimposed on the first visual layer, the second outline graphic visually distinct from the first outline graphic.

7. The computer-implemented method of claim 1, wherein the design generating program is further configured to, in response to selecting the cut action to be performed on the material using the first content object, augment, in the graphical user interface, the cut action icon among the two or more action icons presented in the displayed first available action menu that is associated with the cut action to be performed on the material.

8. The computer-implemented method of claim 7, wherein:
the design generating program is further configured to obtain context information associated with the first and second content objects displayed in the virtual canvas window; and
the dynamically updated respective set of available actions assigned to the second content object is further based on the context information.

9. The computer-implemented method of claim 8, wherein the context information comprises at least one of:
at least one of a dimension, a size, and an orientation of each of the first and second content objects displayed in the virtual canvas window;
a respective content object type associated with each of the first and second content objects;
properties of the material received from a machine configured to perform the selected action on the material using the corresponding content object; and
a type of machine to be employed for creating the unique design on the material.

10. The computer-implemented method of claim 1, wherein the design generating program is further configured to receive, in the virtual canvas window, one or more additional manipulation inputs from the user to at least one of re-size and re-orientate at least one of the first content object and the second content object displayed in the virtual canvas window.

11. The computer-implemented method of claim 1, wherein the operations further comprise instructing a machine in communication with the data processing hardware to create the unique design on the material, the machine capable of performing at least one of the following actions on the material:
electronic cutting;
laser cutting;
milling;
embossing;
stitching;
heat-pressing;
printing;
drawing; and
three-dimensional printing.

12. A system comprising:
data processing hardware; and
memory hardware in communication with the data processing hardware and storing instructions that when executed on the data processing hardware causes the data processing hardware to perform operations comprising:
executing a design generating program configured to display on a screen in communication with the data processing hardware a graphical user interface having:
a virtual canvas window configured to present one or more selected content objects to be incorporated into a unique design; and
a content object selection window comprising available content objects to select from for presentation in the virtual canvas window,
wherein the design generating program is configured to:
receive, in the content object selection window, selection inputs from a user indicating:
selection of a first content object from the available content objects; and
selection of a second content object from the available content objects;
after receiving the selection inputs, display the first and second content objects in the virtual canvas window;
for each corresponding content object among the first and second content objects displayed in the virtual canvas window, assign a respective set of available actions to perform on the material using the corresponding content object, the respective set of available actions comprising a cut action to perform on the material using the corresponding content object and a cut-out action to perform on the material using the corresponding content object;
receive, in the virtual canvas window, a first manipulation input from the user indicating selection of the first content object to manipulate the first content object while displayed in the virtual canvas window;
in response to receiving the first manipulation input, display, in the virtual canvas window, a first available action menu superimposed on the virtual canvas window adjacent to the first content object, the first available action menu presenting two or more action icons each associated with a respective action from the respective set of available actions assigned to the first content object;
receive, in the virtual canvas window, a first action selection input from the user indicating selection of a cut action icon among the two or more action icons presented in the displayed first available action menu that is associated with the respective action;
in response to receiving the first action selection input from the user indicating selection of the cut action icon, select, from the respective set of available actions assigned to the first content object, the cut action to be performed on the material using the first content object, the first content object representing a positive space of the material based on the selection of the cut action, the positive space of the material corresponding to an area of the first content object that will remain after the cut action is performed on the material;
receive, in the virtual canvas window, a second manipulation input from the user indicating selection of the second content object to move the second content object to a target position in the virtual canvas window relative to the first content object displayed in the virtual canvas window;

based on the selection of the cut action to be performed on the material using the first content object and based on the first content object and the second content object overlapping when the second content object is moved to the target position:
    dynamically update the respective set of available actions assigned to the second content object so that the cut action to perform on the material using the second content object is no longer available; and
    display, in the virtual canvas window, a second available action menu superimposed on the virtual canvas window adjacent to the second content object, the second available action menu presenting a cut-out action icon associated with the cut-out action from the dynamically updated respective set of available actions assigned to the second content object;
receive, in the virtual canvas window, a second action selection input from the user indicating selection of the cut-out action icon presented in the displayed second available action menu that is associated with the cut-out action;
in response to receiving the second action selection input from the user indicating selection of the cut-out action icon, select, from the dynamically updated respective set of available actions assigned to the second content object, the cut-out action to be performed on the material using the second content object, the second object representing a negative space of the material based on the selection of the cut-out action, the negative space of the material corresponding to an area of the second content object that will be removed from surrounding portions of the material after the cut-out action is performed on the material; and
generate, for display in the virtual canvas window, the unique design by combining, based on the cut action and the cut-out action, respective portions of the first content object and the second content object.

13. The system of claim 12, wherein the available content objects comprise at least one of shapes, text characters/symbols, and photos.

14. The system of claim 12, wherein:
the graphical user interface displayed on the screen further has a content type selection window including one or more content icons each associated with a respective content object type; and
the design generating program is further configured to:
    receive, in the content type selection window, a content object type input from the user indicating selection of one of the content icons; and
    in response to receiving the content object type input, display, in the graphical user interface, the content object selection window comprising the available content objects to select from for presentation in the virtual canvas window, each available content object comprising the respective content object type associated with the selected one of the content icons.

15. The system of claim 12, wherein the design generating program displays the first and second content objects in the virtual canvas window by:
superimposing, in the graphical user interface, the first content object on a first visual layer for display in the virtual canvas window; and
superimposing, in the graphical user interface, the second content object on a second visual layer for display in the virtual canvas layer, the second content object superimposed on the second visual layer and the first content object superimposed on the first visual layer capable of being manipulated independent from one another while displayed in the virtual canvas window.

16. The system of claim 15, wherein the design generating program is further configured to, when generating the unique design by combining the respective portions of the first content object and the second content object, superimpose the unique design on a flattened output layer for display in the virtual canvas window, the flattened output layer generated by combining the first visual layer and the second visual layer.

17. The system of claim 15, wherein the design generating program is further configured to:
represent the first visual layer as a first outline graphic surrounding the first content object superimposed on the first visual layer; and
represent the second visual layer as a second outline graphic surrounding the second content object superimposed on the first visual layer, the second outline graphic visually distinct from the first outline graphic.

18. The system of claim 12, wherein the design generating program is further configured to, in response to selecting the cut action to be performed on the material using the first content object, augment, in the graphical user interface, the cut action icon among the two or more action icons presented in the displayed first available action menu that is associated with the cut action to be performed on the material.

19. The system of claim 18, wherein:
the design generating program is further configured to obtain context information associated with the first and second content objects displayed in the virtual canvas window; and
the dynamically updated respective set of available actions assigned to the second content object is further based on the context information.

20. The system of claim 19, wherein the context information comprises at least one of:
at least one of a dimension, a size, and an orientation of each of the first and second content objects displayed in the virtual canvas window;
a respective content object type associated with each of the first and second content objects;
properties of the material received from a machine configured to perform the selected action on the material using the corresponding content object; and
a type of machine to be employed for creating the unique design on the material.

21. The system of claim 12, wherein the design generating program is further configured to receive, in the virtual canvas window, one or more additional manipulation inputs from the user to at least one of re-size and re-orientate at least one of the first content object and the second content object displayed in the virtual canvas window.

22. The system of claim 12, wherein the operations further comprise instructing a machine in communication with the data processing hardware to create the unique design on the material, the machine capable of performing at least one of the following actions on the material:
electronic cutting;
laser cutting;
milling;
embossing;
stitching;
heat-pressing;

printing;
drawing; and
three-dimensional printing.

\* \* \* \* \*